United States Patent
Hayman et al.

(10) Patent No.: US 12,203,058 B2
(45) Date of Patent: Jan. 21, 2025

(54) METHODS FOR PREPARING HIGH COLOR CONCENTRATE WINE

(71) Applicant: Delicato Vineyards, Manteca, CA (US)

(72) Inventors: David Charles Hayman, Manteca, CA (US); Denise Rochelle Worden, Manteca, CA (US)

(73) Assignee: Delicato Vineyards, LLC, Manteca, CA (US)

( * ) Notice: Subject to any disclaimer, the term of this patent is extended or adjusted under 35 U.S.C. 154(b) by 692 days.

(21) Appl. No.: 16/909,629

(22) Filed: Jun. 23, 2020

(65) Prior Publication Data
US 2020/0407667 A1 Dec. 31, 2020

Related U.S. Application Data

(60) Provisional application No. 62/950,681, filed on Dec. 19, 2019, provisional application No. 62/866,991, filed on Jun. 26, 2019.

(51) Int. Cl.
*C12G 1/04* (2006.01)
*B01D 61/14* (2006.01)
(Continued)

(52) U.S. Cl.
CPC ............. *C12G 1/04* (2013.01); *B01D 61/145* (2013.01); *C12G 1/0203* (2013.01); *C12H 1/061* (2013.01);
(Continued)

(58) Field of Classification Search
CPC .......... C12G 1/0203; C12G 1/04; C12H 1/14; C12H 1/061; C12H 1/18; C12H 1/063; B01D 61/145
See application file for complete search history.

(56) References Cited

U.S. PATENT DOCUMENTS

| | | |
|---|---|---|
| 4,211,577 A | 7/1980 | Wallin |
| 4,320,009 A | 3/1982 | Hilton et al. |

(Continued)

FOREIGN PATENT DOCUMENTS

| | | |
|---|---|---|
| EP | 2433508 B1 | 3/2013 |
| EP | 1937091 B1 | 4/2015 |

(Continued)

OTHER PUBLICATIONS

Flash Détente: Making Red Wine Redder https://winewitandwisdomswe.com/2015/03/20/flash-detente-making-red-wine-redder/ Mar. 20, 2015). (Year: 2015).*

(Continued)

*Primary Examiner* — Vera Stulii
(74) *Attorney, Agent, or Firm* — Edward J. Baba; Jenny Buchbinder; Bozicevic, Field & Francis LLP (57) ABSTRACT

The present disclosure provides methods of preparing a high color concentrate (HCC) wine. Aspects of the methods may include obtaining a grape fluid composition from one or more grapes, contacting the grape fluid composition with a reagent to modify the pH, adding an amount of distilled alcohol to the grape fluid composition to produce a fortified wine composition, and concentrating the fortified wine composition to produce an HCC wine. Aspects of the methods may further include obtaining a must from one or more grapes, fermenting the must to produce a grape fluid composition having a percent alcohol content, contacting the grape fluid composition with a reagent to modify the pH, and concentrating the grape fluid composition to produce an HCC wine. Also provided is a composition including the HCC wine produced according to the subject methods.

6 Claims, 2 Drawing Sheets

(51) Int. Cl.
  *C12G 1/022* (2006.01)
  *C12H 1/065* (2006.01)
  *C12H 1/07* (2006.01)
  *C12H 1/14* (2006.01)
  *C12H 1/18* (2006.01)

(52) U.S. Cl.
  CPC ............... *C12H 1/063* (2013.01); *C12H 1/14* (2013.01); *C12H 1/18* (2013.01); *B01D 2311/02* (2013.01); *B01D 2311/26* (2013.01)

(56) References Cited

U.S. PATENT DOCUMENTS

| | | | |
|---|---|---|---|
| 4,401,678 A * | 8/1983 | Beaumont | B01D 61/025 426/387 |
| 4,414,231 A | 11/1983 | Ficca | |
| 4,452,822 A | 6/1984 | Shrikhande | |
| 4,479,970 A | 10/1984 | Weetall | |
| 4,500,556 A | 2/1985 | Langston | |
| 6,544,581 B1 | 4/2003 | Shrikhande et al. | |
| 7,767,235 B2 | 8/2010 | Shrikhande et al. | |
| 8,075,929 B2 | 12/2011 | Shrikhande et al. | |
| 8,404,293 B2 | 3/2013 | Sinha et al. | |
| 8,669,419 B2 | 3/2014 | Fuchs et al. | |
| 8,871,284 B2 | 10/2014 | Rubin et al. | |
| 9,260,682 B2 | 2/2016 | Singh | |
| 9,611,452 B2 | 4/2017 | Singh | |
| 9,752,110 B2 | 9/2017 | Rubin et al. | |
| 9,879,209 B2 | 1/2018 | Gnekow | |
| 10,034,910 B2 | 7/2018 | Ianiro et al. | |
| 2009/0304859 A1 | 12/2009 | Tsuruhami et al. | |
| 2013/0055471 A1 | 2/2013 | Holman | |
| 2019/0136165 A1 | 5/2019 | Dahlberg | |

FOREIGN PATENT DOCUMENTS

| | | |
|---|---|---|
| EP | 2380968 B1 | 4/2016 |
| EP | 1670892 B1 | 11/2016 |
| EP | 2065461 B1 | 5/2017 |
| EP | 3212754 A1 | 9/2017 |
| EP | 3196286 B1 | 4/2018 |
| EP | 2231847 B1 | 10/2018 |
| ES | 2259861 | 10/2007 |
| KR | 100664905 | 1/2007 |
| RU | 200011467 | 10/2003 |

OTHER PUBLICATIONS

"Flash Détente" Enartis USA, 1-3, (2015).
Morel-Salmi et al. (2006) "Effect of Flash Release Treatment on Phenolic Extraction and Wine Composition" J. Agric. Food Chem, 54: 4270-4276.
Patterson (2010) "Inquiring Winemaker" Wine Analytics Report, 1-4.

* cited by examiner

METHODS FOR PREPARING HIGH COLOR CONCENTRATE WINE

CROSS-REFERENCE TO RELATED APPLICATIONS

This application claims the benefit of United States Provisional Patent Application Ser. Nos. 62/866,991 filed Jun. 26, 2019 and 62/950,681 filed Dec. 19, 2019; the disclosures of which applications are herein incorporated by reference.

INTRODUCTION

The main differences between white, rosé and red wines are the result of the extraction of substances, e.g., pigments, between the solid parts of the grape (e.g., skins, seeds) and must. In the preparation of white wines, the fermenting of the must is performed in the absence of solid grape components. During fermentation of rosé wines, the must remains in contact with solid grape components for a short time duration of varying lengths. In preparing red wine, the must is fermented with solid grape components to facilitate transfer of pigments located in the skins, pulp to the must.

SUMMARY

The present disclosure provides methods of preparing a high color concentrate (HCC) wine. Aspects of the methods may include obtaining a grape fluid composition from one or more grapes, contacting the grape fluid composition with a reagent to modify the pH, adding an amount of distilled alcohol to the grape fluid composition to produce a fortified wine composition, and concentrating the fortified wine composition to produce an HCC wine. Aspects of the methods may further include obtaining a must from one or more grapes, fermenting the must to produce a grape fluid composition having a percent alcohol content, contacting the grape fluid composition with a reagent to modify the pH, and concentrating the grape fluid composition to produce an HCC wine. Also provided is a composition including the HCC wine produced according to the subject methods.

BRIEF DESCRIPTION OF THE DRAWINGS

The invention may be best understood from the following detailed description when read in conjunction with the accompanying drawings. Included in the drawings are the following figures.

DETAILED DESCRIPTION

The present disclosure provides methods of preparing a high color concentrate (HCC) wine. Aspects of the methods may include obtaining a grape fluid composition from one or more grapes, contacting the grape fluid composition with a reagent to modify the pH, adding an amount of distilled alcohol to the grape fluid composition to produce a fortified wine composition, and concentrating the fortified wine composition to produce an HCC wine. Aspects of the methods may further include obtaining a must from one or more grapes, fermenting the must to produce a grape fluid composition having a percent alcohol content, contacting the grape fluid composition with a reagent to modify the pH, and concentrating the grape fluid composition to produce an HCC wine. Also provided is a composition including the HCC wine produced according to the subject methods.

Before exemplary embodiments of the present invention are described, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, some potential and exemplary methods and materials may now be described. Any and all publications mentioned herein are incorporated herein by reference to disclose and describe the methods and/or materials in connection with which the publications are cited. It is understood that the present disclosure supersedes any disclosure of an incorporated publication to the extent there is a contradiction.

It must be noted that as used herein and in the appended claims, the singular forms "a", "an", and "the" include plural referents unless the context clearly dictates otherwise. Thus, for example, reference to "a membrane anchored polynucleotide" includes a plurality of such membrane-anchored polynucleotides and reference to "the polynucleotide" includes reference to one or more polynucleotides, and so forth.

It is further noted that the claims may be drafted to exclude any element which may be optional. As such, this statement is intended to serve as antecedent basis for use of such exclusive terminology as "solely", "only" and the like in connection with the recitation of claim elements, or the use of a "negative" limitation.

The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed. To the extent such publications may set out definitions of a term that conflicts with the explicit or implicit definition of the present disclosure, the definition of the present disclosure controls.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

Methods

The present disclosure provides methods for preparing a high color concentrated (HCC) wine. As used herein, the term "HCC wine" refers to a liquid composition obtained, e.g., extracted, purified, concentrated, from one or more grapes. The HCC wine may be prepared from processing, e.g., heating, cooling, fortifying, and/or fermenting a must and/or grape fluid composition obtained from one or more grapes. The HCC wine may be blended with additional wine to modify the color, flavor, texture, mouth feel, and the like, of the overall blended wine composition. In certain embodiments, the method includes one or more steps of adding exogenous alcohol to a liquid composition of the methods, e.g., the grape fluid composition and/or HCC wine. As used herein, "exogenous alcohol" refers to alcohol that is not produced in any step of the subject method, e.g., not produced by fermentation of the must or any liquid composition produced in the subject methods. An exogenous alcohol may be alcohol that is added to a liquid composition of the subject methods. An exogenous alcohol may include, e.g., a distilled alcohol or spirit. The exogenous alcohol may be used to preserve the HCC wine. In other embodiments, the method includes producing an endogenous alcohol from fermentation. As used herein, an "endogenous alcohol" refers to alcohol that is produced naturally from sugars in the must during fermentation. The endogenous alcohol may be generated from the sugars present in the one or more grapes and/or must of the subject methods. The endogenous alcohol may be used to preserve the HCC wine. Various steps and aspects of the methods will now be described in greater detail below.

First Embodiment

Aspects of the methods may include obtaining a grape fluid composition from one or more grapes; contacting the grape fluid composition with a reagent to modify the pH; adding an amount of distilled alcohol to the grape fluid composition to produce a fortified wine composition; and concentrating the fortified wine composition to produce a HCC wine.

Figure 1:
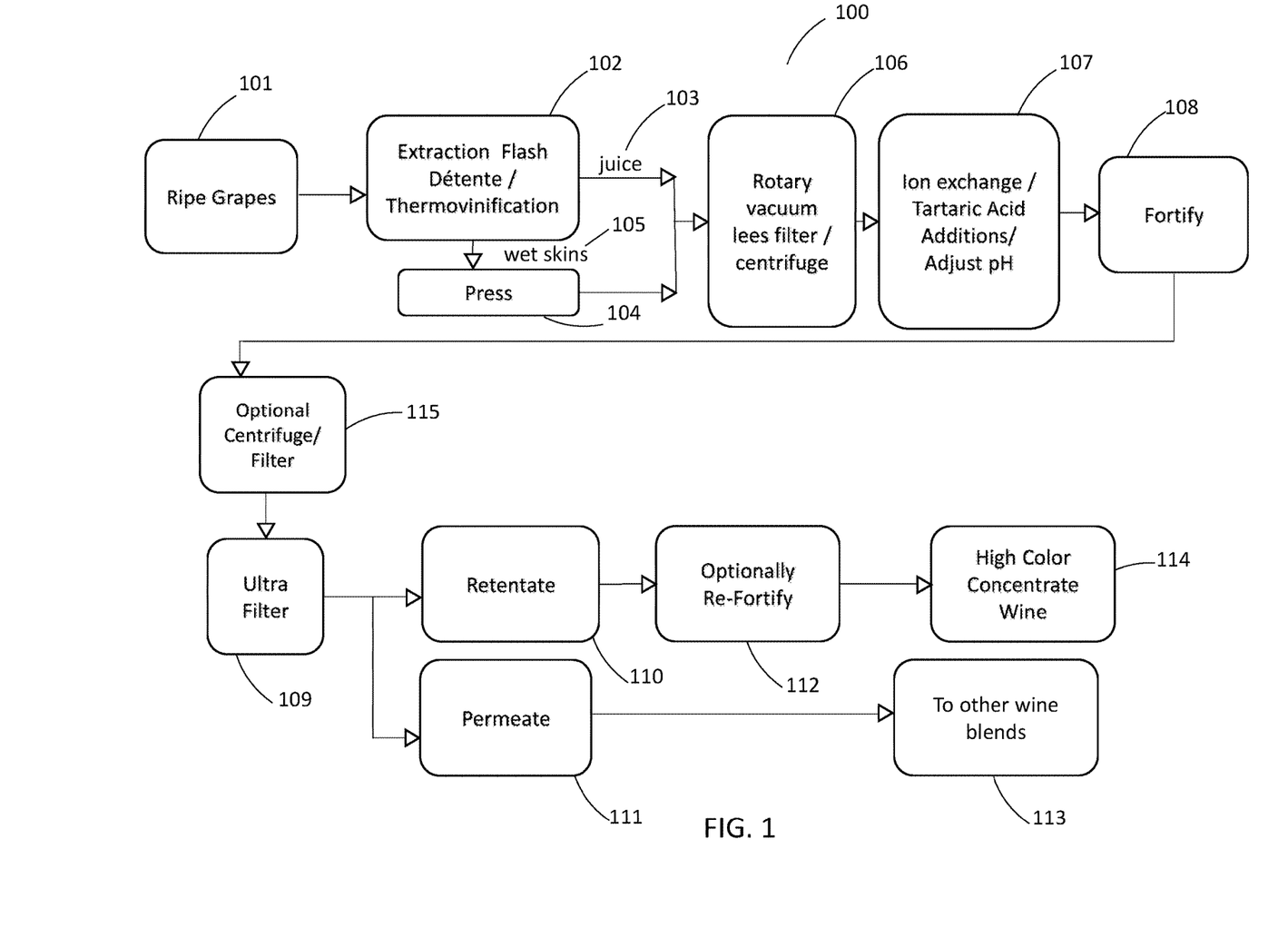
FIG. 1 shows a schematic of an embodiment of the subject methods for preparing a HCC wine.

The first embodiment of the method is shown in FIG. 1. In the first embodiment, the method may include adding exogenous alcohol to a liquid composition produced by the method, e.g., to a grape fluid composition or HCC wine produced by the method. FIG. 1 provides a non-limiting example for the method (100) of preparing a HCC wine and will be used to discuss the aspects of the subject methods. Methods of the present disclosure include obtaining a grape fluid composition from one or more grapes (101). In some cases, the process of obtaining a grape fluid composition includes producing a must and processing the must, as described in detail below. As used herein in its conventional sense, the term "must" refers to freshly crushed grape juice that may include any component of a whole grape such as, e.g., one or more whole grapes, grape seeds, grape stems, grape skins, grape pulp, grape pomace, and mixtures thereof. In some cases, the method includes applying pressure to the one or more grapes to produce must. In some cases, the method includes pressing or crushing the one or more grapes to produce must. In some cases, pressure is applied to the one or more grapes in a pressing or crushing machine to produce must. In some cases, the method includes destemming the one or more grapes, e.g., in a de-stemmer, in the process of producing must.

Any suitable variety of grapes may be used in the subject methods. Non-limiting examples of grape properties that may vary in the subject methods include, e.g., grape ripeness, sugar content (e.g., degrees Brix), acid levels, and pH levels. Any suitable variety of grapes may be used in the subject methods such as, e.g., rubired grapes, ruby cabernet grapes, cabernet sauvignon grapes, merlot grapes, syrah grapes, mourvedre grapes, dornfielder grapes, and alicanti grapes. In some cases, the sugar content of the one or more grapes ranges from 20 to 30 degrees Brix, from 21 to 30 degrees Brix, from 22 to 30 degrees Brix, from 23 to 30 degrees Brix, from 24 to 30 degrees Brix, or from 25 to 30 degrees Brix. In some cases, the sugar content of the one or more grapes ranges from 20 to 50 degrees Brix, from 20 to 40 degrees Brix, from 22 to 38 degrees Brix, from 23 to 36 degrees Brix, or from 25 to 35 degrees Brix, or from 28 to 32 degrees Brix. In some cases, the sugar content of the one or more grapes is 15 degrees Brix or greater, 16 degrees Brix or greater, 17 degrees Brix or greater, 18 degrees Brix or greater, 19 degrees Brix or greater, 20 degrees Brix or greater, 21 degrees Brix or greater, 22 degrees Brix or greater, 24 degrees Brix or greater, 25 degrees Brix or greater, 26 degrees Brix or greater, 27 degrees Brix or greater, 28 degrees Brix or greater, 29 degrees Brix or greater, or 30 degrees Brix or greater.

The term "rubired" is used herein in its conventional sense to refer to a Californian red-fleshed hybrid grape variety. The term "rubired grapes" is used herein in its conventional sense to refer to grapes produced by a Californian red-fleshed hybrid grape variety that is a hybrid of the Tinta Cão grape variety and the Alicante Ganzin grape variety. The rubired grape plant may be a hybrid of a non-*Vitis vinifera* grape plant and a *Vitis vinifera* grape plant. A rubired grape includes color in the flesh of the grape and yields pigmented juice instead of clear juice.

Methods of the present disclosure further include subjecting the must to a thermovinification or flash détente process (102). As used herein in their conventional sense, the terms "thermovinification" and "flash détente" refer to heating and cooling must to facilitate the extraction of colorants or pigments from solid grape components such as, e.g., grape skins. During thermovinification and flash détente, must may be heated to high temperatures, e.g., 100 to 145 degrees Fahrenheit and 175 to 190 degrees Fahrenheit respectfully, in a heat exchange column or tubular heat exchanger. The heated must, for example via the flash détente, may then be rapidly cooled to temperatures ranging from 80 to 110 degrees Fahrenheit, e.g., in a vacuum flash cooling system or chamber. The flash heating and cooling may cause a rupturing of cells in grape skins due to the rapid evaporation of water and expansion of steam in the cells, which releases the pigments from the grape skin. The products of thermovinification and flash détente include, e.g., a grape fluid composition (103) such as colored grape juice, wet skins (105), aromatic steam, and/or condensate.

The must may be heated to any suitable temperature during thermovinification or flash détente. In some cases, the must is heated to a temperature of 70 degrees Fahrenheit or greater, 80 degrees Fahrenheit or greater, 90 degrees Fahrenheit or greater, 100 degrees Fahrenheit or greater, 110 degrees Fahrenheit or greater, 120 degrees Fahrenheit or greater, 130 degrees Fahrenheit or greater, 140 degrees Fahrenheit or greater, 150 degrees Fahrenheit or greater, 160 degrees Fahrenheit or greater, 170 degrees Fahrenheit or greater, 180 degrees Fahrenheit or greater, 190 degrees Fahrenheit or greater, or 200 degrees Fahrenheit or greater. In some cases, the must is heated to a temperature ranging from 70 to 200 degrees Fahrenheit, from 75 to 200 degrees Fahrenheit, from 80 to 200 degrees Fahrenheit, from 90 to 200 degrees Fahrenheit, from 100 to 200 degrees Fahrenheit, from 110 to 200 degrees Fahrenheit, from 120 to 200 degrees Fahrenheit, from 130 to 200 degrees Fahrenheit, from 140 to 200 degrees Fahrenheit, from 150 to 200 degrees Fahrenheit, from 100 to 190 degrees Fahrenheit, from 110 to 180 degrees Fahrenheit, from 110 to 170 degrees Fahrenheit, from 110 to 160 degrees Fahrenheit, from 110 to 150 degrees Fahrenheit, from 110 to 140 degrees Fahrenheit, or from 115 to 130 degrees Fahrenheit.

In some cases, the must is heated for a period of time. In some instances, the must is heated for 1 to 5 minutes, for 1 to 10 minutes, for 1 to 30 minutes, for 10 to 15 minutes, for 10 to 20 minutes, for 10 to 30 minutes, for 10 minutes to an hour, for one to two hours, for one to five hours, for one to eight hours, for one to ten hours, for five to eight hours, for five to ten hours, for five to fifteen hours, or for five to twenty hours. In some cases, the must is heated for 1 minute or more, for 5 minutes or more, for 10 minutes or more, for 15 minutes or more, for 20 minutes or more, for 30 minutes or more, for 40 minutes or more, for 50 minutes or more, for an hour or more, for 2 hours or more, for 3 hours or more, for 4 hours or more, for 5 hours or more, for 6 hours or more, for 7 hours or more, for 8 hours or more, for 9 hours or more, or for 10 hours or more.

In some cases, the method further includes resting the must during the thermovinification or flash détente process, e.g., after heating. As used herein, the term "resting" refers to leaving the must to sit for a period of time. The must may be rested for a period of time of at least one hour, at least 2 hours, at least three hours, at least four hours, at least five hours, at least six hours, at least seven hours, at least eight hours, at least nine hours, at least ten hours, at least eleven hours, at least twelve hours, at least fifteen hours, at least twenty hours, at least thirty hours, or at least forty hours. While resting, the temperature of the must may be maintained at 80 degrees Fahrenheit or greater, 90 degrees Fahrenheit or greater, 100 degrees Fahrenheit or greater, 110 degrees Fahrenheit or greater, 120 degrees Fahrenheit or greater, 130 degrees Fahrenheit or greater, 140 degrees Fahrenheit or greater, 150 degrees Fahrenheit or greater, 160 degrees Fahrenheit or greater, 170 degrees Fahrenheit or greater, 180 degrees Fahrenheit or greater, 190 degrees Fahrenheit or greater, or 200 degrees Fahrenheit or greater. In some cases, the must may be maintained at a temperature ranging from 70 to 200 degrees Fahrenheit, from 75 to 200 degrees Fahrenheit, from 75 to 190 degrees Fahrenheit, from 75 to 180 degrees Fahrenheit, from 75 to 170 degrees Fahrenheit, from 75 to 160 degrees Fahrenheit, from 75 to 150 degrees Fahrenheit, from 75 to 140 degrees Fahrenheit, from 75 to 130 degrees Fahrenheit, or from 75 to 120 degrees Fahrenheit.

In some cases, the must is further cooled to any suitable temperature during the thermovinification or flash détente process. In some cases, the must may be cooled to a temperature of 80 degrees Fahrenheit or less, 75 degrees Fahrenheit or less, 70 degrees Fahrenheit or less, 65 degrees Fahrenheit or less, 60 degrees Fahrenheit or less, 55 degrees Fahrenheit or less, 50 degrees Fahrenheit or less, 45 degrees Fahrenheit or less, 40 degrees Fahrenheit or less, 35 degrees Fahrenheit or less, 30 degrees Fahrenheit or less, 25 degrees Fahrenheit or less, or 20 degrees Fahrenheit or less. In some cases, the must is cooled to a temperature ranging from 20 to 80 degrees Fahrenheit, from 20 to 70 degrees Fahrenheit, from 20 to 60 degrees Fahrenheit, from 20 to 50 degrees Fahrenheit, from 20 to 45 degrees Fahrenheit, from 25 to 40 degrees Fahrenheit, from 25 to 35 degrees Fahrenheit, from 30 to 50 degrees Fahrenheit, from 30 to 45 degrees Fahrenheit, or from 30 to 35 degrees Fahrenheit.

The must may be cooled for any suitable amount of time. In some instances, the must is cooled for 1 to 5 minutes, for 1 to 10 minutes, for 1 to 30 minutes, for 10 to 30 minutes, for 10 to 20 minutes, for 10 to 15 minutes, for 10 minutes to an hour, for one to two hours, for one to five hours, for one to eight hours, for one to ten hours, for five to eight hours, for five to ten hours, for five to fifteen hours, or for five to twenty hours. In some cases, the must is cooled for 1 minute or more, for 5 minutes or more, for 10 minutes or more, for 15 minutes or more, for 20 minutes or more, for 30 minutes or more, for 40 minutes or more, for 50 minutes or more, for an hour or more, for 2 hours or more, for 3 hours or more, for 4 hours or more, for 5 hours or more, for 6 hours or more, for 7 hours or more, for 8 hours or more, for 9 hours or more, or for 10 hours or more.

In some cases, the methods may further include draining the must to obtain a grape fluid composition, e.g., grape juice, (103). The method may include draining the grape fluid composition from the must during and/or after the thermovinification or flash détente process (102). In some cases, the method includes draining the grape fluid composition from the must after resting the must. As used herein in its conventional sense, the term "draining" may refer to separating a liquid phase from the must. In some cases, a grape fluid composition, e.g., a grape juice, is drained or separated from the must. The draining of the grape fluid composition from the must may occur at any suitable temperature including, e.g., any temperature of the must as described above. In some cases, the draining includes transferring the grape fluid composition to another tank or vessel separate from the tank or vessel in which the thermovinification/flash détente processes occurred.

In some cases, the methods of the present disclosure further include introducing one or more reagents or additives to the must before and/or during the thermovinification or flash détente process (102). The one or more reagents may be added to stabilize and preserve the must. In some cases, the must is contacted with the one or more reagents, as described in detail below. In certain embodiments, the one or more reagents or additives include sulfur dioxide, a reagent to modify pH, an enzyme, and tannins, as described in detail below.

In certain embodiments, the method includes adjusting the must with an amount of sulfur dioxide. Sulfur dioxide may be added to the must to maintain stability by, e.g., preventing microbial growth and oxidation. The must may be adjusted with sulfur dioxide at any step of thermovinification or flash détente, e.g., before, during, and/or after the heating and/or cooling of the must. In some cases, the amount of sulfur dioxide adjusted with the must is 40 ppm or higher, 45 ppm or higher, 50 ppm or higher, 55 ppm or higher, 60 ppm or higher, 65 ppm or higher, 70 ppm or higher, 75 ppm or higher, 80 ppm or higher, 85 ppm or higher, 90 ppm or higher, 95 ppm or higher, 100 ppm or higher, 105 ppm or higher, 110 ppm or higher, 115 ppm or higher, 120 ppm or higher, 125 ppm or higher, 130 ppm or higher, 135 ppm or higher, 140 ppm or higher, 145 ppm or higher, or 150 ppm or higher. In some cases, the amount of sulfur dioxide adjusted with the must ranges from 50 to 400 ppm, from 50 to 300 ppm, from 50 to 200 ppm, from 20 to 120 ppm, from 30 to 120 ppm, from 40 to 120 ppm, from 50 to 120 ppm, from 60 to 120 ppm, from 70 to 120 ppm, from 80 to 120 ppm, from 90 to 120 ppm, from 70 to 110 ppm, from 80 to 110 ppm, or from 90 to 110 ppm. In some cases, the must that has been adjusted with sulfur dioxide includes an amount of free sulfur dioxide ($FSO_2$). As used herein in its conventional sense, the term "free sulfur dioxide" refers to sulfur dioxide present in a liquid composition, e.g., must, that is not bound to sulfur dioxide binding compounds and is available to react with other molecules. The concentration of free sulfur dioxide in the must adjusted with an amount of sulfur dioxide may be 10 ppm or higher, 15 ppm or higher, 20 ppm or higher, 25 ppm or higher, 30 ppm or higher, 35 ppm or higher, 40 ppm or higher, 45 ppm or higher, 50 ppm or higher, 55 ppm or higher, or 60 ppm or higher. In some cases, the concentration of free sulfur dioxide in the must adjusted with an amount of sulfur dioxide may range from 5 ppm to 60 ppm, from 5 ppm to 50 ppm, from 5 ppm to 40 ppm, from 10 ppm to 60 ppm, from 15 ppm to 60 ppm, from 20 ppm to 60 ppm, from 30 ppm to 60 ppm, from 30 ppm to 50 ppm, from 30 ppm to 45 ppm, from 35 ppm to 45 ppm, or from 35 ppm to 40 ppm.

Methods of the present disclosure may further include modifying the pH of the must. The pH may be raised or lowered to any desirable level according to the subject methods. In some cases, the methods include contacting the must with a reagent to modify the pH of the must. In some cases, the methods include acidifying the must. In some cases, the reagent includes an acidifying agent such as, e.g., tartaric acid, malic acid, among others. In some cases, the must is subjected to ion exchange by means of contacting the must with a charged resin column. In some cases, the must is treated or contacted with an ion exchange resin. In some cases, the must is contacted with the resin of a resin column. In some cases, the reagent includes an acidifying agent such as, e.g., a resin or resin beads of an ion exchange column. The resin or resin beads may be activated or charged with a solution of any suitable acid, e.g., sulfuric acid, hydrochloric acid, etc. The pH of the must before the contacting may range from 5.0 to 9.0, from 4.0 to 8.0, from 4.0 to 7.0, from 2.5 to 5.0, from 2.8 to 4.5, or from 3.0 to 4.0. In some cases, the method includes contacting the must with a reagent to obtain a pH of 5.0 or less, 4.9 or less, 4.8 or less, 4.5 or less, 4.4 or less, 4.3 or less, 4.2 or less, 4.1 or less, 3.8 or less, 3.7 or less, 3.6 or less, 3.5 or less, 3.4 or less, 3.3 or less, 3.2 or less, 3.1 or less, 3.0 or less, 2.9 or less, 2.8 or less, 2.7 or less, 2.6 or less, 2.5 or less, 2.4 or less, 2.3 or less, 2.2 or less, 2.1 or less, or 2.0 or less. In some cases, the method includes contacting the must with a reagent to obtain a pH ranging from 2.0 to 4.0, from 2.0 to 5.0, from 2.5 to 5.0, from 2.5 to 4.0, from 2.5 to 3.9, from 2.5 to 3.8, from 2.5 to 3.7, from 2.5 to 3.5, from 2.5 to 3.0, from 2.6 to 3.6, from 2.6 to 3.5, from 2.7 to 3.4, from 2.7 to 3.3, from 2.7 to 3.2, from 2.7 to 3.1, from 2.8 to 3.5, from 2.8 to 3.2, from 2.8 to 3.0, from 3.0 to 3.5, from 3.1 to 3.3, from 3.6 to 4.0, or from 3.7 to 3.9.

The must may be adjusted with any suitable amount of reagent to modify the pH. In some cases, the amount of reagent adjusted with the must is about 3.5 g/L to about 12 g/L, such as about 3.75 g/L to about 11.75 g/L, about 4 g/L to about 11.5 g/L, about 4.25 g/L to about 11.25 g/L, about 4.5 g/L to about 11, about 4.75 g/L to about 10.75 g/L, about 5 g/L to about 10.5 g/L, about 5.25 g/L to about 10.25 g/L, about 5.5 g/L to about 10 g/L, about 5.75 to about 9.75 g/L, about 6 g/L to about 9.5 g/L, about 6.25 g/L to about 9.25 g/L, about 6.5 g/L to about 9, 6.75 g/L to about 8.75 g/L, about 7 g/L to about 8.5 g/L, about 7.25 g/L to about 8.25 g/L, or about 7.5 g/L to about 8 g/L. In some cases, the amount of reagent adjusted with the must ranges from 3.5 g/L to 12 g/L, such as 3.75 g/L to 11.75 g/L, 4 g/L to 11.5 g/L, 4.25 g/L to 11.25 g/L, 4.5 g/L to 11 g/L, 4.75 g/L to 10.75 g/L, 5 g/L to 10.5 g/L, 5.25 g/L to 10.25 g/L, 5.5 g/L to 10 g/L, 5.75 to 9.75 g/L, 6 g/L to 9.5 g/L, 6.25 g/L to 9.25 g/L, 6.5 g/L to 9 g/L, 6.75 g/L to 8.75 g/L, 7 g/L to 8.5 g/L, 7.25 g/L to 8.25 g/L, or 7.5 g/L to 8 g/L.

In some embodiments, the pH is adjusted with tartaric acid to achieve a pH from about 4.0 to 2.8. In certain embodiments, the pH may start at about 4.4 or about 3.4. In certain embodiments the pH may be adjusted using ion exchange to adjust the pH where wine passes through the ion exchange resins in a column. In such embodiments, potassium ions (and possibly calcium and magnesium) from the wine are absorbed into the resin, and hydrogen ions from the charged resin go into solution in the wine adjusting the pH down to a desired level.

In another aspect, the methods may include contacting the must with an amount of enzyme. The enzyme may be suitable for use during thermovinification and flash détente and may improve clarification and filterability of the must. In some cases, the enzyme may increase pigment extraction into the liquid phase of the must, e.g., by damaging the cellular structures of grapes such as the cell and vacuole membranes of grapes. In some cases, the enzyme is a heat-activated enzyme. An enzyme for use in the subject methods may be stable and active at temperatures of 80 degrees Fahrenheit or greater, 90 degrees Fahrenheit or greater, 100 degrees Fahrenheit or greater, 110 degrees Fahrenheit or greater, 120 degrees Fahrenheit or greater, 130 degrees Fahrenheit or greater, 140 degrees Fahrenheit or greater, 150 degrees Fahrenheit or greater, 160 degrees Fahrenheit or greater, 170 degrees Fahrenheit or greater, 180 degrees Fahrenheit or greater, or 190 degrees Fahrenheit or greater. In certain embodiments, the enzyme is stable and active at temperatures ranging from 50 to 130 degrees Fahrenheit, from 60 to 120 degrees Fahrenheit, from 70 to 120 degrees Fahrenheit, or from 80 to 120 degrees Fahrenheit. In some cases, the enzyme is a pectolytic enzyme. Suitable thermovinification enzymes include, but are not limited to pectinase, such as Pectinex®, Rohapect®, ColorPro®, etc.

The must may be adjusted with any suitable amount of an enzyme. In some cases, the amount of enzyme adjusted with the must is 2 ppm or higher, 3 ppm or higher, 4 ppm or higher 5 ppm or higher. 10 ppm or higher, 15 ppm or higher, 20 ppm or higher, 25 ppm or higher, 30 ppm or higher, 35 ppm or higher, 40 ppm or higher, 45 ppm or higher, 50 ppm or higher, 55 ppm or higher, 60 ppm or higher, 65 ppm or higher, 70 ppm or higher, 75 ppm or higher, 80 ppm or higher, 85 ppm or higher, 90 ppm or higher, 95 ppm or higher, 100 ppm or higher, 105 ppm or higher, 110 ppm or higher, 115 ppm or higher, 120 ppm or higher, 125 ppm or higher, 130 ppm or higher, 135 ppm or higher, 140 ppm or higher, 145 ppm or higher, 150 ppm or higher, 160 ppm or higher, 170 ppm or higher, 180 ppm or higher, 190 ppm or higher, or 200 ppm or higher. In some cases, the amount of enzyme adjusted with the must ranges from 40 ppm to 400 ppm, from 40 ppm to 300 ppm, from 40 ppm to 200 ppm, from 40 ppm to 100 ppm, from 10 ppm to 200 ppm, from 20 ppm to 200 ppm, from 30 ppm to 200 ppm, 40 ppm to 200 ppm, from 50 ppm to 200 ppm, from 60 ppm to 200 ppm, or from 70 ppm to 200 ppm.

In certain embodiments, the method further includes contacting the must with an amount of tannins. As used herein in its conventional sense, the term "tannins" refers to polyphenolic compounds found in oak, grape skins, seeds, and stems. The must may be adjusted with an amount of tannins before, during and/or after the cooling of the must during the thermovinification or flash détente process. In some cases, the method includes adding an amount of tannins to the must. The amount of tannins added per 1000 gallons of must may range from 1 pound to 10 pounds, from 2 pounds to 8 pounds, from 2 pounds to 6 pounds, from 3 pounds to 5 pounds, from 2 pounds to 5 pounds, or from 3 pounds to 4 pounds. The added tannins may bind and make more stable extracted tannin and other color related materials from the grapes.

Methods of the present disclosure may further include applying pressure (104) to one or more components of the must. In some cases, the one or more components include a solid phase of the must such as grape seeds, grape stems, grape skins, grape pulp, grape pomace, and/or mixtures thereof. In some cases, the method includes applying pressure to wet skins (105) produced during the thermovinification and flash détente process (102). The method may include applying pressure to the one or more components of the must to produce a grape fluid composition, e.g., grape juice, by pressing or crushing the one or more components. The grape fluid composition obtained from the pressing (104) may be combined with an amount of grape fluid composition (103) produced by the draining of the must, as described above. In some cases, pressure is applied to the one or more components of the must in a pressing or crushing machine.

Methods of the present disclosure may further include clarifying (106) the grape fluid composition produced from thermovinification and flash détente (102) and/or pressing (104). As used herein in its conventional sense, the term "clarifying" or "clarification" refers to the removal of insoluble matter suspended in the grape fluid composition. In some cases, the clarification of the grape fluid composition includes removing broken cells, dirt and soil, fungi, bacteria, tartrates, proteins, pectins, grape skin, pulp, stems, and/or mixtures thereof from the grape fluid composition. In some cases, the clarification of a grape fluid composition includes settling, fining, filtration, centrifugation, flotation, refrigeration and racking. In certain embodiments, the clarifying includes filtering and/or centrifuging the grape fluid composition. The grape fluid composition may be clarified using any suitable filter and centrifuge devices known in the art such as, e.g., a rotary vacuum lees filter, a centrifuge having a vertical axis, and a plate and frame lees filter (clarity dependent). In certain embodiments, the method includes clarifying, e.g., centrifuging and/or filtering, the grape fluid composition to obtain a turbidity of 50 NTU or less, 45 NTU or less, 40 NTU or less, 35 NTU or less, 30 NTU or less, 25 NTU or less, 20 NTU or less, 15 NTU or less, 10 NTU or less, 5 NTU or less, 3 NTU or less, 2 NTU or less, or 1 NTU or less. In some cases, the method includes clarifying the grape fluid composition to obtain a turbidity that ranges from 1 to 20 NTU, from 1 to 15 NTU, from 1 to 10 NTU, from 1 to 5 NTU, from 0 to 4 NTU, from 0 to 2 NTU, from 0 to 1 NTU, from 0 to 0.5 NTU, or from 0 to 0.1 NTU.

Methods of the present disclosure may further include modifying the pH (107) of the grape fluid composition. In some cases, the methods include contacting the grape fluid composition with a reagent (e.g., an acid or ion exchange resin) to modify the pH of the grape fluid composition according to the methods as described above. The pH of the grape fluid composition before the contacting may range from 5.0 to 9.0, from 4.0 to 8.0, from 4.0 to 7.0, from 2.5 to 5.0, from 2.8 to 4.5, or from 3.0 to 4.0. In some cases, the method includes contacting the grape fluid composition with a reagent to obtain a pH of 5.0 or less, 4.9 or less, 4.8 or less, 4.5 or less, 4.4 or less, 4.3 or less, 4.2 or less, 4.1 or less, 3.8 or less, 3.7 or less, 3.6 or less, 3.5 or less, 3.4 or less, 3.3 or less, 3.2 or less, 3.1 or less, 3.0 or less, 2.9 or less, 2.8 or less, 2.7 or less, 2.6 or less, 2.5 or less, 2.4 or less, 2.3 or less, 2.2 or less, 2.1 or less, or 2.0 or less. In some cases, the method includes contacting the grape fluid composition with a reagent to obtain a pH ranging from 2.0 to 4.0, from 2.0 to 5.0, from 2.5 to 5.0, from 2.5 to 4.0, from 2.5 to 3.9, from 2.5 to 3.8, from 2.5 to 3.7, from 2.5 to 3.5, from 2.5 to 3.0, from 2.6 to 3.6, from 2.6 to 3.5, from 2.7 to 3.4, from 2.7 to 3.3, from 2.7 to 3.2, from 2.7 to 3.1, from 2.8 to 3.5, from 2.8 to 3.2, from 2.8 to 3.0, from 3.0 to 3.5, from 3.1 to 3.3, from 3.6 to 4.0, or from 3.7 to 3.9.

In certain aspects, methods of the present disclosure further include fortifying (108), i.e., adding an amount of distilled alcohol derived from grapes to the grape fluid composition to produce a fortified wine composition. As used herein in its conventional sense, the term "distilled alcohol" refers to a high proof alcohol such as, e.g., a hard liquor or spirit, that has been produced by distillation of grains, fruit, or vegetables that have undergone alcoholic fermentation. The distilled alcohol may act as a stabilizer and preservative of the grape fluid composition and facilitate long term storage.

The distilled alcohol may have any suitable alcohol content. In some cases, the distilled alcohol is 20% alcohol or more by volume, 30% alcohol or more by volume, 40% alcohol or more by volume, 50% alcohol or more by volume, 60% alcohol or more by volume, 70% alcohol or more by volume, 80% alcohol or more by volume, or 90% alcohol or more by volume, or 93% alcohol or more by volume, or 95% alcohol or more by volume, or 96% alcohol or more by volume. In some cases, the distilled alcohol is at least 20% alcohol by volume, at least 30% alcohol by volume, at least 40% alcohol by volume, at least 50% alcohol by volume, at least 60% alcohol by volume, at least 70% alcohol by volume, at least 80% alcohol by volume, or at least 90% alcohol by volume. In some cases, the distilled alcohol contains from 10 to 60% alcohol by volume, from 10 to 50% alcohol by volume, from 10 to 40% alcohol by volume, from 10 to 30% alcohol by volume, from 10 to 20% alcohol by volume. In some cases, the distilled alcohol contains an amount of alcohol by volume that is 1% alcohol by volume or greater, 5% alcohol by volume or greater, 10% alcohol by volume or greater, 15% alcohol by volume or greater, or 20% alcohol by volume or greater.

In some cases, the fortified wine composition contains an amount of alcohol by volume that is at least 5% alcohol by volume, at least 8% alcohol by volume, at least 10% alcohol, at least 15% alcohol, or at least 20% alcohol. In some cases, the fortified wine composition contains from 5 to 60% alcohol by volume, from 5 to 50% alcohol by volume, from 5 to 40% alcohol by volume, from 5 to 30% alcohol by volume, from 5 to 20% alcohol by volume, from 8 to 60% alcohol by volume, from 8 to 50% alcohol by volume, from 8 to 40% alcohol by volume, from 8 to 30% alcohol by volume, from 8 to 20% alcohol by volume, from 8 to 15% alcohol by volume, from 10 to 60% alcohol by volume, from 10 to 50% alcohol by volume, from 10 to 40% alcohol by volume, from 10 to 30% alcohol by volume, from 10 to 20% alcohol by volume, from 10 to 15% alcohol by volume, from 10 to 13% alcohol by volume, from 10 to 12% alcohol by volume, or from 9 to 15% alcohol by volume.

In some cases, the fortified wine composition is further processed after addition of distilled alcohol. The further processing may include the adjustment of one or more qualities of the fortified wine composition to promote stability. In some cases, the further processing includes testing the pH of the fortified wine composition. Where the testing reveals the fortified wine composition has an undesirable pH, the methods may include contacting or treating the fortified wine composition with a reagent to further adjust the pH to obtain a suitable pH according to the methods for modifying pH as described above. In some cases, the further processing includes clarifying (115), e.g., filtering and/or centrifuging, the fortified wine composition to obtain a desirable NTU, according to the methods described above. In certain aspects, the further processing includes heating the fortified wine composition. In some case, the fortified wine composition is heated to temperatures ranging from 40 to 90 degrees Fahrenheit, from 40 to 85 degrees Fahrenheit, from 40 to 80 degrees Fahrenheit, from 40 to 75 degrees Fahrenheit, from 45 to 70 degrees Fahrenheit, from 40 to 65 degrees Fahrenheit, from 40 to 60 degrees Fahrenheit, from 40 to 50 degrees Fahrenheit, from 45 to 60 degrees Fahrenheit, from 50 to 65 degrees Fahrenheit, from 50 to 60 degrees Fahrenheit, or from 55 to 60 degrees Fahrenheit. The fortified wine composition may be heated for any suitable amount of time including, e.g., 1 to 5 minutes, for 1 to 10 minutes, for 1 to 30 minutes, for 10 to 30 minutes, for 10 minutes to an hour, for one to two hours, for one to five hours, for one to eight hours, for one to ten hours, for five to eight hours, for five to ten hours, for five to fifteen hours, or for five to twenty hours.

Methods of the present disclosure may further include concentrating the fortified wine composition to produce a HCC wine. In some cases, the concentrating includes ultra-filtering (109) the fortified wine composition. As used herein in its conventional sense, the term "ultra-filtering" or "ultra-filtration" refers to the passing of a fluid composition through a semi-permeable membrane under a pressure gradient to obtain a desired concentration of one or more components of the fluid composition. The process of ultra-filtering the fortified wine composition may produce a permeate (111) and a HCC wine, which includes an amount of retentate (110) and may be stored for later use as a wine blender (114). The HCC wine may have any suitable qualities, e.g., pH, percent alcohol by volume, or sugar content, as described in further detail below. As used herein in its conventional sense, the term "retentate" refers to one or more components of an ultra-filtered liquid composition, e.g., fortified wine composition, that can be retained by a membrane or filter. The retentate may include molecular components having molecular weights greater than $5 \times 10^3$ to $20 \times 10^4$ Da, the membrane cutoff. The permeate (111) may be stored for later use as a blender to other wine blends, such as, e.g., rosé or red blends (113). As used herein in its conventional sense, the term "permeate" refers to one or more components of an ultra-filtered liquid composition that can pass through a membrane or filter and may include a liquid or low molecular weight solutes. The molecular weight of the molecular components of the permeate may be $5 \times 10^3$ to $20 \times 10^4$ Da or less, the membrane cutoff.

The fortified wine composition may be concentrated, e.g., ultra-filtered, to produce a HCC wine including any suitable amount of retentate. The percent concentration of the HCC wine may be a percent by volume (v/v), i.e., volume of permeate divided by the total volume of fortified wine composition, multiplied by 100%. In some cases, the HCC wine is at least 20% concentrated, at least 30% concentrated, at least 40% concentrated, at least 50% concentrated, at least 60% concentrated, at least 70% concentrated, at least 80% concentrated, or at least 90% concentrated. In some cases, the HCC wine is 60 to 95% concentrated, 65 to 95% concentrated, 70 to 95% concentrated, 75 to 95% concentrated, 75 to 90% concentrated, or 75 to 85% concentrated. In certain embodiments, the HCC wine is 80% concentrated.

The concentrating of the fortified wine composition to produce an HCC wine may occur at any suitable temperature. In some cases, the concentrating occurs at a temperature ranging from 40 to 100 degrees Fahrenheit, from 40 to 90 degrees Fahrenheit, from 40 to 85 degrees Fahrenheit, from 40 to 80 degrees Fahrenheit, from 40 to 75 degrees Fahrenheit, from 40 to 70 degrees Fahrenheit, from 40 to 65 degrees Fahrenheit, from 40 to 50 degrees Fahrenheit, from 40 to 60 degrees Fahrenheit, from 45 to 60 degrees Fahrenheit, from 50 to 60 degrees Fahrenheit, or from 55 to 60 degrees Fahrenheit.

The concentrating of the fortified wine composition may occur under any suitable feed pressure. In some cases, the feed pressure is maintained throughout the process of concentrating the fortified wine composition. In some cases, the method includes ultra-filtering the fortified wine composition under a feed pressure that ranges from 30 to 150 psi, from 30 to 140 psi, from 30 to 130 psi, from 30 to 120 psi, from 30 to 110 psi, from 30 to 100 psi, from 30 to 90 psi, from 30 to 85 psi, from 30 to 80 psi, from 30 to 70 psi, from 30 to 60 psi, from 30 to 50 psi, from 40 to 150 psi, from 45 to 150 psi, from 50 to 150 psi, from 55 to 150 psi, from 60 to 150 psi, from 65 to 150 psi, from 70 to 150 psi, from 40 to 130 psi, from 40 to 120 psi, or from 40 to 110 psi. In some cases, the method includes ultra-filtering the fortified wine composition under a pressure ranging from 5 to 50 psi, from 9 to 30 psi, from 10 to 30 psi, from 9 to 20 psi, or from 9 to 15 psi.

Any suitable membrane may be used for concentrating the fortified wine composition. In some cases, the method includes concentrating the fortified wine composition using a $10^2$ to $10^3$ Da, $10^3$ to $10^6$ Da, $10^3$ to $10^5$ Da, or $10^3$ to $10^6$ Da molecular weight cutoff ultrafiltration membrane. In some cases, the method includes concentrating the fortified wine composition using a 2,000-6,000 Dalton, 4000-6000 Dalton, or 5,000 Dalton molecular weight cutoff ultrafiltration membrane. One or more membranes may be used in the ultra-filtration methods of the present disclosure. The retentate may be recirculated one or more times through the ultra-filtration membrane(s).

In certain embodiments, methods of the present disclosure further include optionally re-fortifying (112) the HCC wine before later use as in blending with additional wine (114). In some cases, the re-fortifying may include measuring or testing the alcohol content of the HCC wine. Where the testing reveals the HCC wine has an undesirable alcohol content, an amount of distilled alcohol may be added to the HCC wine to produce, e.g., a fortified HCC wine. The distilled alcohol and fortified HCC wine may have any suitable percent alcohol by volume as described above.

In another aspect, the method includes additional means of preparing the HCC wine for long-term storage. The preparing may include adding to the HCC wine one or more blenders such as, e.g., sulfur dioxide, in the manner described above to preserve the stability of the HCC wine. In some cases, sulfur dioxide may be added to one or more of the must, the grape fluid composition, the fortified wine composition, and the HCC wine at any step of the subject methods, according to the methods described above. In some cases, one or more of the must, the grape fluid composition, the fortified wine composition, and the HCC wine have an amount of $FSO_2$ in any of the ranges described herein. In some cases, the preparing includes cooling the HCC wine. The HCC wine may be cooled to any suitable temperature, e.g., to facilitate stability during storage. In some cases, the HCC wine may be cooled to a temperature of 80 degrees Fahrenheit or less, 75 degrees Fahrenheit or less, 70 degrees Fahrenheit or less, 65 degrees Fahrenheit or less, 60 degrees Fahrenheit or less, 55 degrees Fahrenheit or less, 50 degrees Fahrenheit or less, 45 degrees Fahrenheit or less, 40 degrees Fahrenheit or less, 35 degrees Fahrenheit or less, 30 degrees Fahrenheit or less, 25 degrees Fahrenheit or less, or 20 degrees Fahrenheit or less. In some cases, the HCC wine is cooled to a temperature ranging from 15 to 50 degrees Fahrenheit, from 20 to 45 degrees Fahrenheit, from 25 to 40 degrees Fahrenheit, from 45 to 50 degrees Fahrenheit, or from 30 to 35 degrees Fahrenheit. The final temperature of the HCC wine may be maintained throughout storage.

Second Embodiment

Aspects of the methods may include obtaining a must from one or more grapes, fermenting the must to produce a grape fluid composition having a percent alcohol content, contacting the grape fluid composition with a reagent to modify the pH, and concentrating the grape fluid composition to produce an HCC wine.

Figure 2:
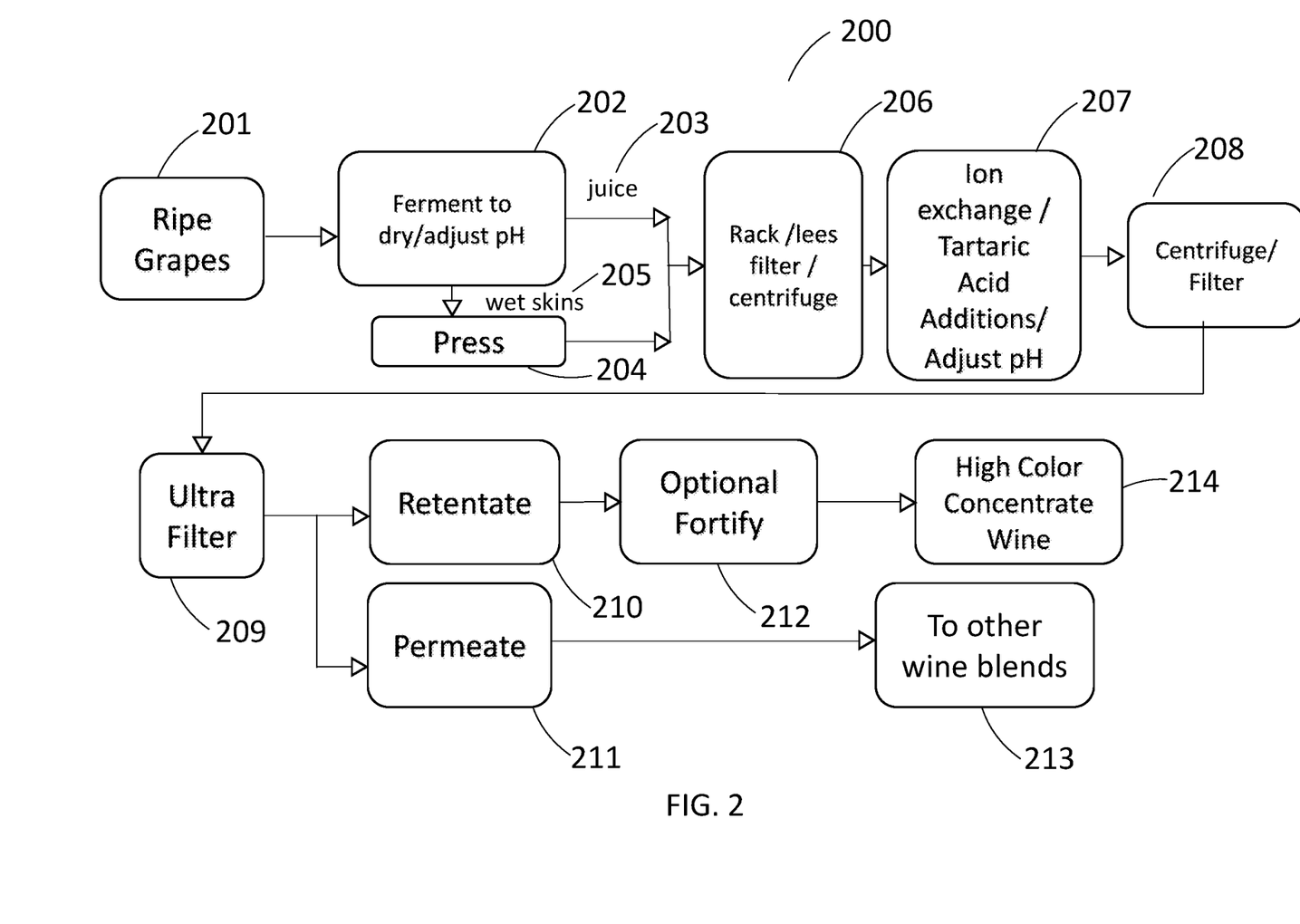
FIG. 2 shows a schematic of a second embodiment of the subject methods for preparing a HCC wine.

A second embodiment of the method is shown in FIG. 2. In the second embodiment, the method may include producing endogenous alcohol by fermentation of the must produced in the subject method. In some cases, no additional alcohol or exogenous alcohol is added to any liquid composition, e.g., must or grape fluid composition, of the method. In certain embodiments, the liquid compositions of the method are not subjected to flash détente and/or thermovinification. FIG. 2 provides a non-limiting example for the method (200) of preparing a HCC wine and will be used to discuss the aspects of the subject methods. Methods of the present disclosure include obtaining a must from one or more grapes (201). In some cases, the method includes applying pressure to the one or more grapes to produce and obtain the must. In some cases, the method includes pressing or crushing the one or more grapes to produce must. In some cases, pressure is applied to the one or more grapes in a pressing or crushing machine to produce must. In some cases, the method includes destemming the one or more grapes, e.g., in a de-stemmer, in the process of producing must.

Any suitable variety of grapes may be used in the subject methods. Non-limiting examples of grape properties that may vary in the subject methods include, e.g., grape ripeness, sugar content (e.g., degrees Brix), acid levels, and pH levels. Any suitable variety of grapes may be used in the subject methods such as, e.g., rubired grapes (e.g., as described in detail above), ruby cabernet grapes, cabernet sauvignon grapes, merlot grapes, syrah grapes, mourvedre grapes, dornfielder grapes, and alicanti grapes. In some cases, the sugar content of the one or more grapes ranges from 20 to 30 degrees Brix, from 21 to 30 degrees Brix, from 22 to 30 degrees Brix, from 23 to 30 degrees Brix, from 24 to 30 degrees Brix, or from 25 to 30 degrees Brix. In some cases, the sugar content of the one or more grapes ranges from 20 to 50 degrees Brix, from 20 to 40 degrees Brix, from 22 to 38 degrees Brix, from 23 to 36 degrees Brix, or from 25 to 35 degrees Brix, or from 28 to 32 degrees Brix. In some cases, the sugar content of the one or more grapes is 15 degrees Brix or greater, 16 degrees Brix or greater, 17 degrees Brix or greater, 18 degrees Brix or greater, 19 degrees Brix or greater, 20 degrees Brix or greater, 21 degrees Brix or greater, 22 degrees Brix or greater, 24 degrees Brix or greater, 25 degrees Brix or greater, 26 degrees Brix or greater, 27 degrees Brix or greater, 28 degrees Brix or greater, 29 degrees Brix or greater, or 30 degrees Brix or greater.

Methods of the present disclosure further include subjecting the must to fermentation (202). The methods may include fermenting the must to produce a grape fluid composition having a percent alcohol content. The fermentation may be carried out in any suitable manner according to conventional techniques. The process of fermentation may include two stages, a first, primary fermentation aerobic stage using yeast to convert the natural sugar in the grapes into alcohol while the resultant carbon dioxide is allowed to escape. The first stage may be followed by a secondary, anerobic, malolactic fermentation stage, as described in detail below. The must may be transferred to any suitable container to allow the fermentation to take place such as, e.g., a stainless steel tank, a wooden barrel, etc. In some cases, the must is contacted with an amount of yeast before and/or during fermentation. Yeast that may be added to the must before and/or during fermentation include, e.g., one or more strains of *Saccharomyces cerevisiae*. In some cases, the fermentation occurs by way of yeasts that are naturally present in the must, on the one or more grapes, in vineyards, in a fermentation vessel, in a wine cellar, etc. Once the fermentation process is complete, the must may be drained to yield a grape fluid composition having a percent alcohol content.

The must may be fermented for any suitable period of time. In some instances, the must is fermented for one to two hours, for one to five hours, for one to eight hours, for one to ten hours, for five to eight hours, for five to ten hours, for five to fifteen hours, for five to twenty hours, for twelve to twenty-four hours, or for twelve to thirty-six hours. In some cases, the must is fermented for at least 1 day, for at least 2 days, for at least 3 days, for at least 4 days, for at least 5 days, for at least 6 days, for at least one week, for at least two weeks, or for at least three weeks. In some cases, the must is fermented for a period of time ranging from 1 to 10 days, from 2 to 8 days, from 3 to 8 days, from 3 to 7 days, or from 3 to 5 days. In some cases, the must is allowed to ferment until at least some portion of the sugars in the must are converted to alcohol. In some cases, the must is allowed to ferment until the residual sugars in the must range from 17-35 g/L, from 0-17 g/L, or from 0-1 g/L. In some cases, the must is allowed to ferment until the residual sugars in the must are 10 g/L or less, 8 g/L or less, 5 g/L or less, 3 g/L or less, 2 g/L or less, or 1 g/L or less. In some cases, the must is allowed to ferment until most or all of the sugars in the must are converted to alcohol. In some cases, the must is allowed to ferment to produce a dry grape fluid composition. As used herein in its conventional sense, the term "dry" means that all fermentable sugar has been converted to alcohol by the yeast.

In some cases, the methods of the present disclosure further include introducing one or more reagents or additives to the must before, during, and/or after the fermentation process (202). The one or more reagents may be added to stabilize and preserve the must and/or to aid the fermentation process. In some cases, the must is contacted with one or more of the reagents, as described in detail below. In certain embodiments, the one or more reagents or additives include sulfur dioxide, a reagent to modify pH, an enzyme, tannins, oak chips, yeast nutrient, and DAP, as described in detail below.

In certain embodiments, the method includes adjusting the must with an amount of sulfur dioxide. Sulfur dioxide may be added to the must to maintain stability by, e.g., preventing microbial growth and oxidation. The must may be adjusted with sulfur dioxide at any step of the subject methods, e.g., before, during, and/or after the fermentation of the must. In some cases, the amount of sulfur dioxide adjusted with the must is 40 ppm or higher, 45 ppm or higher, 50 ppm or higher, 55 ppm or higher, 60 ppm or higher, 65 ppm or higher, 70 ppm or higher, 75 ppm or higher, 80 ppm or higher, 85 ppm or higher, 90 ppm or higher, 95 ppm or higher, 100 ppm or higher, 105 ppm or higher, 110 ppm or higher, 115 ppm or higher, 120 ppm or higher, 125 ppm or higher, 130 ppm or higher, 135 ppm or higher, 140 ppm or higher, 145 ppm or higher, or 150 ppm or higher. In some cases, the amount of sulfur dioxide adjusted with the must ranges from 50 to 400 ppm, from 50 to 300 ppm, from 50 to 200 ppm, from 20 to 120 ppm, from 30 to 120 ppm, from 40 to 120 ppm, from 50 to 120 ppm, from 60 to 120 ppm, from 70 to 120 ppm, from 80 to 120 ppm, from 90 to 120 ppm, from 70 to 110 ppm, from 80 to 110 ppm, or from 90 to 110 ppm. In some cases, the must that has been adjusted with sulfur dioxide includes an amount of free sulfur dioxide ($FSO_2$). The concentration of free sulfur dioxide in the must adjusted with an amount of sulfur dioxide may be 10 ppm or higher, 15 ppm or higher, 20 ppm or higher, 25 ppm or higher, 30 ppm or higher, 35 ppm or higher, 40 ppm or higher, 45 ppm or higher, 50 ppm or higher, 55 ppm or higher, or 60 ppm or higher. In some cases, the concentration of free sulfur dioxide in the must adjusted with an amount of sulfur dioxide may range from 5 ppm to 60 ppm, from 5 ppm to 50 ppm, from 5 ppm to 40 ppm, from 10 ppm to 60 ppm, from 15 ppm to 60 ppm, from 20 ppm to 60 ppm, from 30 ppm to 60 ppm, from 30 ppm to 50 ppm, from 30 ppm to 45 ppm, from 35 ppm to 45 ppm, or from 35 ppm to 40 ppm.

Methods of the present disclosure may further include modifying the pH of the must. The pH may be raised or lowered to any desirable level according to the subject methods. In some cases, the methods include contacting the must with a reagent to modify the pH of the must. In some cases, the methods include acidifying the must. In some cases, the reagent includes an acidifying agent such as, e.g., tartaric acid, malic acid, among others. In some cases, the must is subjected to ion exchange by means of contacting the must with a charged resin column. In some cases, the must is treated or contacted with an ion exchange resin. In some cases, the must is contacted with the resin of a resin column. In some cases, the reagent includes an acidifying agent such as, e.g., a resin or resin beads of an ion exchange column. The resin or resin beads may be activated or charged with a solution of any suitable acid, e.g., sulfuric acid, hydrochloric acid, etc. The pH of the must before the contacting may range from 5.0 to 9.0, from 4.0 to 8.0, from 4.0 to 7.0, from 2.5 to 5.0, from 2.8 to 4.5, or from 3.0 to 4.0. In some cases, the method includes contacting the must with a reagent to obtain a pH of 5.0 or less, 4.9 or less, 4.8 or less, 4.5 or less, 4.4 or less, 4.3 or less, 4.2 or less, 4.1 or less, 3.8 or less, 3.7 or less, 3.6 or less, 3.5 or less, 3.4 or less, 3.3 or less, 3.2 or less, 3.1 or less, 3.0 or less, 2.9 or less, 2.8 or less, 2.7 or less, 2.6 or less, 2.5 or less, 2.4 or less, 2.3 or less, 2.2 or less, 2.1 or less, or 2.0 or less. In some cases, the method includes contacting the must with a reagent to obtain a pH ranging from 2.0 to 4.0, from 2.0 to 5.0, from 2.5 to 5.0, from 2.5 to 4.0, from 2.5 to 3.9, from 2.5 to 3.8, from 2.5 to 3.7, from 2.5 to 3.5, from 2.5 to 3.0, from 2.6 to 3.6, from 2.6 to 3.5, from 2.7 to 3.4, from 2.7 to 3.3, from 2.7 to 3.2, from 2.7 to 3.1, from 2.8 to 3.5, from 2.8 to 3.2, from 2.8 to 3.0, from 3.0 to 3.5, from 3.1 to 3.3, from 3.6 to 4.0, or from 3.7 to 3.9.

The must may be adjusted with any suitable amount of reagent to modify the pH. In some cases, the amount of reagent adjusted with the must is about 3.5 g/L to about 12 g/L, such as about 3.75 g/L to about 11.75 g/L, about 4 g/L to about 11.5 g/L, about 4.25 g/L to about 11.25 g/L, about 4.5 g/L to about 11 g/L, about 4.75 g/L to about 10.75 g/L, about 5 g/L to about 10.5 g/L, about 5.25 g/L to about 10.25 g/L, about 5.5 g/L to about 10 g/L, about 5.75 to about 9.75 g/L, about 6 g/L to about 9.5 g/L, about 6.25 g/L to about 9.25 g/L, about 6.5 g/L to about 9, 6.75 g/L to about 8.75 g/L, about 7 g/L to about 8.5 g/L, about 7.25 g/L to about 8.25 g/L, or about 7.5 g/L to about 8 g/L. In some cases, the amount of reagent adjusted with the must ranges from 3.5 g/L to 12 g/L, such as from 3.75 g/L to 11.75 g/L, from 4 g/L to 11.5 g/L, from 4.25 g/L to 11.25 g/L, from 4.5 g/L to 11 g/L, from 4.75 g/L to 10.75 g/L, from 5 g/L to 10.5 g/L, from 5.25 g/L to 10.25 g/L, from 5.5 g/L to 10 g/L, from 5.75 to 9.75 g/L, from 6 g/L to 9.5 g/L, from 6.25 g/L to 9.25 g/L, from 6.5 g/L to 9 g/L, from 6.75 g/L to 8.75 g/L, from 7 g/L to 8.5 g/L, from 7.25 g/L to 8.25 g/L, or from 7.5 g/L to 8 g/L.

In some embodiments, the pH is adjusted with tartaric acid to achieve a pH from about 4.0 to 2.8. In certain embodiments, the pH may start at about 4.4 or about 3.4. In certain embodiments, the pH may be adjusted using ion exchange to adjust the pH where wine passes through the ion exchange resins in a column. In such embodiments, potassium ions (and possibly calcium and magnesium) from the wine are absorbed into the resin, and hydrogen ions from the charged resin go into solution in the wine adjusting the pH down to a desired level.

In another aspect, the methods may include contacting the must with an amount of enzyme. The enzyme may improve clarification and filterability of the must. In some cases, the enzyme may increase pigment extraction into the liquid phase of the must, e.g., by damaging the cellular structures of grapes such as the cell and vacuole membranes of grapes. In some cases, the enzyme is a heat-activated enzyme. An enzyme for use in the subject methods may be stable and active at temperatures of 80 degrees Fahrenheit or greater, 90 degrees Fahrenheit or greater, 100 degrees Fahrenheit or greater, 110 degrees Fahrenheit or greater, 120 degrees Fahrenheit or greater, 130 degrees Fahrenheit or greater, 140 degrees Fahrenheit or greater, 150 degrees Fahrenheit or greater, 160 degrees Fahrenheit or greater, 170 degrees Fahrenheit or greater, 180 degrees Fahrenheit or greater, or 190 degrees Fahrenheit or greater. In certain embodiments, the enzyme is stable and active at temperatures ranging from 50 to 130 degrees Fahrenheit, from 60 to 120 degrees Fahrenheit, from 70 to 120 degrees Fahrenheit, or from 80 to 120 degrees Fahrenheit. In some cases, the enzyme is a pectolytic enzyme. Suitable enzymes include, but are not limited to, pectinase, such as Pectinex®, Rohapect®, ColorPro®, etc.

The must may be adjusted with any suitable amount of an enzyme. In some cases, the amount of enzyme adjusted with the must is 2 ppm or higher, 3 ppm or higher, 4 ppm or higher 5 ppm or higher. 10 ppm or higher, 15 ppm or higher, 20 ppm or higher, 25 ppm or higher, 30 ppm or higher, 35 ppm or higher, 40 ppm or higher, 45 ppm or higher, 50 ppm or higher, 55 ppm or higher, 60 ppm or higher, 65 ppm or higher, 70 ppm or higher, 75 ppm or higher, 80 ppm or higher, 85 ppm or higher, 90 ppm or higher, 95 ppm or higher, 100 ppm or higher, 105 ppm or higher, 110 ppm or higher, 115 ppm or higher, 120 ppm or higher, 125 ppm or higher, 130 ppm or higher, 135 ppm or higher, 140 ppm or higher, 145 ppm or higher, 150 ppm or higher, 160 ppm or higher, 170 ppm or higher, 180 ppm or higher, 190 ppm or higher, or 200 ppm or higher. In some cases, the amount of enzyme adjusted with the must ranges from 40 ppm to 400 ppm, from 40 ppm to 300 ppm, from 40 ppm to 200 ppm, from 40 ppm to 100 ppm, from 10 ppm to 200 ppm, from 20 ppm to 200 ppm, from 30 ppm to 200 ppm, 40 ppm to 200 ppm, from 50 ppm to 200 ppm, from 60 ppm to 200 ppm, or from 70 ppm to 200 ppm.

In certain embodiments, the must is contacted with an amount of oak chips before and/or during fermentation. The oak chips may impart flavour compounds such as lactones (coconut and woody flavours), vanillin (vanilla flavours) and eugenol (spicy flavours) to the fermenting must.

In certain embodiments, the must is contacted with an amount of yeast nutrient before and/or during fermentation. The must may be contacted with any suitable amount of yeast nutrient to assist the yeasts in producing a complete, rapid fermentation. In certain embodiments, the must is contacted with an amount of diammonium phosphate (DAP). The must may be contacted with any suitable amount of DAP to assist the yeasts in producing a complete, rapid fermentation. In some cases, the must is contacted with an amount of DAP ranging from up to 3.7 g/gal, from up to 4 g/gal, from up to 5 g/gal, from 0.1 to 5 g/gal, 0.1 to 4 g/gal, from 0.1 to 1 g/gal, from 0.2 to 0.8 g/gal, or from 0.5 to 0.75 g/gal.

In certain embodiments, the method further includes contacting the must with an amount of tannins. The must may be adjusted with an amount of tannins before, during and/or after the fermentation of the must (202). In some cases, the method includes adding an amount of tannins to the must. The amount of tannins added per 1000 gallons of must may range from 1 pound to 10 pounds, from 2 pounds to 8 pounds, from 2 pounds to 6 pounds, from 3 pounds to 5 pounds, from 2 pounds to 5 pounds, from 3 pounds to 4 pounds, from 1 pound to 5 pounds, from 1 pound to 4 pounds, from 1 pound to 3 pounds, from 1 pound to 2 pounds, or from 1.5 pounds to 2 pounds. The added tannins may bind and make more stable extracted tannin and other color related materials from the grapes.

In some cases, the methods may further include draining the must to obtain a grape fluid composition having a percent alcohol content (203). The method may include draining the grape fluid composition having a percent alcohol content from the must during and/or after the fermentation process (202). In some cases, the draining includes transferring the grape fluid composition to another tank or vessel separate from the tank or vessel in which the fermentation processes occurred.

In some cases, the grape fluid composition has a reduced sugar content compared to the must before fermentation. In some cases, the sugar content of the grape fluid composition ranges from −5 to 20 degrees Brix, from −5 to 15 degrees Brix, from −5 to 10 degrees Brix, from −2 to 10 degrees Brix, from 0 to 20 degrees Brix, from 0 to 15 degrees Brix, from 0 to 10 degrees Brix, from 0 to 5 degrees Brix, from −5 to 5 degrees Brix, from −5 to 2 degrees Brix, from −5 to 0 degrees Brix, from −4 to 5 degrees Brix, from −4 to 2 degrees Brix, from −4 to 0 degrees Brix from −3 to 5 degree Brix, from −3 to 2 degrees Brix, from −3 to 0 degrees Brix, from −2 to 5 degrees, from −2 to 2 degrees, or from −2 to 0 degrees Brix. In some cases, the sugar content of the grape fluid composition ranges from 5 to 15 degrees Brix, from 5 to 10 degrees Brix, from 1 to 10 degrees Brix, from 1 to 5 degrees Brix, or from 0 to 3 degrees Brix. In some cases, the sugar content of the grape fluid composition is 20 degrees Brix or less, 15 degrees Brix or less, 10 degrees Brix or less, 5 degrees Brix or less, 2 degrees Brix or less, 0 degree Brix or less, or −2 degree Brix or less.

In some cases, the grape fluid composition contains an amount of alcohol by volume that is at least 5% alcohol by volume, at least 8% alcohol by volume, at least 10% alcohol, at least 15% alcohol, or at least 20% alcohol. In some cases, the grape fluid composition contains from 5 to 60% alcohol by volume, from 5 to 50% alcohol by volume, from 5 to 40% alcohol by volume, from 5 to 30% alcohol by volume, from 5 to 20% alcohol by volume, from 8 to 60% alcohol by volume, from 8 to 50% alcohol by volume, from 8 to 40% alcohol by volume, from 8 to 30% alcohol by volume, from 8 to 20% alcohol by volume, from 8 to 15% alcohol by volume, from 10 to 60% alcohol by volume, from 10 to 50% alcohol by volume, from 10 to 40% alcohol by volume, from 10 to 30% alcohol by volume, from 10 to 20% alcohol by volume, from 10 to 15% alcohol by volume, from 12 to 15% alcohol by volume, from 10 to 13% alcohol by volume, from 10 to 12% alcohol by volume, or from 9 to 15% alcohol by volume.

In some cases, the grape fluid composition has a pH that is different from the pH of the must before fermentation. The pH of the must before fermenting may range from 5.0 to 9.0, from 4.0 to 8.0, from 4.0 to 7.0, from 2.5 to 5.0, from 2.8 to 4.5, or from 3.0 to 4.0. In some cases, the grape fluid composition has a pH of 5.0 or less, 4.9 or less, 4.8 or less, 4.5 or less, 4.4 or less, 4.3 or less, 4.2 or less, 4.1 or less, 3.8 or less, 3.7 or less, 3.6 or less, 3.5 or less, 3.4 or less, 3.3 or less, 3.2 or less, 3.1 or less, 3.0 or less, 2.9 or less, 2.8 or less, 2.7 or less, 2.6 or less, 2.5 or less, 2.4 or less, 2.3 or less, 2.2 or less, 2.1 or less, or 2.0 or less. In some cases, the grape fluid composition has a pH ranging from 2.0 to 4.0, from 2.0 to 5.0, from 2.5 to 5.0, from 2.5 to 4.0, from 2.5 to 3.9, from 2.5 to 3.8, from 2.5 to 3.7, from 2.5 to 3.5, from 2.5 to 3.0, from 2.6 to 3.6, from 2.6 to 3.5, from 2.7 to 3.4, from 2.7 to 3.3, from 2.7 to 3.2, from 2.7 to 3.1, from 2.8 to 3.5, from 2.8 to 3.2, from 2.8 to 3.0, from 2.9 to 3.1, from 2.8 to 3.1, from 3.0 to 3.5, from 3.1 to 3.3, from 3.6 to 4.0, or from 3.7 to 3.9.

In some cases, the grape fluid composition includes an amount of free sulfur dioxide ($FSO_2$). The concentration of free sulfur dioxide may be 10 ppm or higher, 15 ppm or higher, 20 ppm or higher, 25 ppm or higher, 30 ppm or higher, 35 ppm or higher, 40 ppm or higher, 45 ppm or higher, 50 ppm or higher, 55 ppm or higher, or 60 ppm or higher. In some cases, the concentration of free sulfur dioxide in the grape fluid composition may range from 5 ppm to 60 ppm, from 5 ppm to 50 ppm, from 5 ppm to 40 ppm, from 10 ppm to 60 ppm, from 15 ppm to 60 ppm, from 20 ppm to 60 ppm, from 30 ppm to 60 ppm, from 30 ppm to 50 ppm, from 30 ppm to 45 ppm, from 35 ppm to 45 ppm, or from 35 ppm to 40 ppm.

Methods of the present disclosure may further include applying pressure (204) to one or more components of the must. In some cases, the one or more components include a solid phase of the must such as grape seeds, grape stems, grape skins, grape pulp, grape pomace, and/or mixtures thereof. In some cases, the method includes applying pressure to wet skins (205) produced from obtaining the must and/or from the fermentation process (202). The method may include applying pressure to the one or more components of the must to produce a grape fluid composition having a percent alcohol content by pressing or crushing the one or more components. The grape fluid composition obtained from the pressing (204) may be combined with an amount of grape fluid composition (203) produced by the draining of the must, as described above. In some cases, pressure is applied to the one or more components of the must in a pressing or crushing machine.

Methods of the present disclosure may further include clarifying (206) the grape fluid composition produced from fermentation (202) and/or pressing (204). In some cases, the clarification of the grape fluid composition includes removing broken cells, dirt and soil, fungi, bacteria, tartrates, proteins, pectins, grape skin, pulp, stems, and/or mixtures thereof from the grape fluid composition. In some cases, the clarification of a grape fluid composition includes settling, fining, filtration, centrifugation, flotation, refrigeration and racking. In certain embodiments, the clarifying includes filtering and/or centrifuging the grape fluid composition. The grape fluid composition may be clarified using any suitable filter and centrifuge devices known in the art such as, e.g., a rotary vacuum lees filter, a centrifuge having a vertical axis, and a plate and frame lees filter (clarity dependent). In certain embodiments, the method includes clarifying, e.g., centrifuging and/or filtering, the grape fluid composition to obtain a turbidity of 50 NTU or less, 45 NTU or less, 40 NTU or less, 35 NTU or less, 30 NTU or less, 25 NTU or less, 20 NTU or less, 15 NTU or less, 10 NTU or less, 5 NTU or less, 3 NTU or less, 2 NTU or less, or 1 NTU or less. In some cases, the method includes clarifying the grape fluid composition to obtain a turbidity that ranges from 1 to 20 NTU, from 1 to 15 NTU, from 1 to 10 NTU, from 1 to 5 NTU, from 0 to 4 NTU, from 0 to 2 NTU, from 0 to 1 NTU, from 0 to 0.5 NTU, or from 0 to 0.1 NTU.

In some cases, the methods further include subjecting the grape fluid composition to a second fermentation. In some cases, the second fermentation is malolactic fermentation. As used herein in its conventional sense, the term "malolactic fermentation" refers to a secondary, anerobic, malolactic fermentation stage where malic acid is converted to lactic acid. In certain embodiments, the grape fluid composition is contacted with an amount of malolactic bacteria.

The grape fluid composition may be fermented for any suitable period of time. In some instances, the grape fluid composition is fermented for one to two hours, for one to five hours, for one to eight hours, for one to ten hours, for five to eight hours, for five to ten hours, for five to fifteen hours, for five to twenty hours, for twelve to twenty-four hours, or for twelve to thirty-six hours. In some cases, the grape fluid composition is fermented for at least 1 day, for at least 2 days, for at least 3 days, for at least 4 days, for at least 5 days, for at least 6 days, for at least one week, for at least two weeks, or for at least three weeks. In some cases, the grape fluid composition is fermented for a period of time ranging from 1 to 10 days, from 2 to 8 days, or from 3 to 5 days.

In certain embodiments, the method includes adjusting the grape fluid composition with an amount of sulfur dioxide during, and/or after the second fermentation. In some cases, the amount of sulfur dioxide adjusted with the grape fluid composition is 40 ppm or higher, 45 ppm or higher, 50 ppm or higher, 55 ppm or higher, 60 ppm or higher, 65 ppm or higher, 70 ppm or higher, 75 ppm or higher, 80 ppm or higher, 85 ppm or higher, 90 ppm or higher, 95 ppm or higher, 100 ppm or higher, 105 ppm or higher, 110 ppm or higher, 115 ppm or higher, 120 ppm or higher, 125 ppm or higher, 130 ppm or higher, 135 ppm or higher, 140 ppm or higher, 145 ppm or higher, or 150 ppm or higher. In some cases, the amount of sulfur dioxide adjusted with the grape fluid composition ranges from 50 to 400 ppm, from 50 to 300 ppm, from 50 to 200 ppm, from 20 to 120 ppm, from 30 to 120 ppm, from 40 to 120 ppm, from 50 to 120 ppm, from 60 to 120 ppm, from 70 to 120 ppm, from 80 to 120 ppm, from 90 to 120 ppm, from 70 to 110 ppm, from 80 to 110 ppm, from 90 to 110 ppm, from 30 to 60 ppm, from 40 to 60 ppm, from 40 to 50 ppm, or from 50 to 60 ppm. In some cases, the grape fluid composition that has been adjusted with sulfur dioxide includes an amount of free sulfur dioxide ($FSO_2$). The concentration of free sulfur dioxide in the grape fluid composition adjusted with an amount of sulfur dioxide may be 10 ppm or higher, 15 ppm or higher, 20 ppm or higher, 25 ppm or higher, 30 ppm or higher, 35 ppm or higher, 40 ppm or higher, 45 ppm or higher, 50 ppm or higher, 55 ppm or higher, or 60 ppm or higher. In some cases, the concentration of free sulfur dioxide in the grape fluid composition adjusted with an amount of sulfur dioxide may range from 5 ppm to 60 ppm, from 5 ppm to 50 ppm, from 5 ppm to 40 ppm, from 10 ppm to 60 ppm, from 15 ppm to 60 ppm, from 20 ppm to 60 ppm, from 30 ppm to 60 ppm, from 30 ppm to 50 ppm, from 30 ppm to 45 ppm, from 35 ppm to 45 ppm, or from 35 ppm to 40 ppm.

In some cases, the method further includes cooling the grape fluid composition during and/or after the second fermentation. In some cases, the grape fluid composition is cooled to a temperature of 60 degrees Fahrenheit or less, 55 degrees Fahrenheit or less, 50 degrees Fahrenheit or less, 45 degrees Fahrenheit or less, 40 degrees Fahrenheit or less, 35 degrees Fahrenheit or less, 30 degrees Fahrenheit or less, 25 degrees Fahrenheit or less, or 20 degrees Fahrenheit or less. In some cases, the grape fluid composition is cooled to a temperature ranging from 15 to 50 degrees Fahrenheit, from 25 to 50 degrees Fahrenheit, from 25 to 45 degrees Fahrenheit, from 45 to 50 degrees Fahrenheit, from 45 to 55 degrees Fahrenheit, from 45 to 60 degrees Fahrenheit, or from 30 to 45 degrees Fahrenheit.

Methods of the present disclosure may further include modifying the pH (207) of the grape fluid composition. In some cases, the methods include contacting the grape fluid composition with a reagent (e.g., an acid or ion exchange resin) to modify the pH of the grape fluid composition according to the methods as described above. The pH of the grape fluid composition before the contacting may range from 5.0 to 9.0, from 4.0 to 8.0, from 4.0 to 7.0, from 2.5 to 5.0, from 2.8 to 4.5, or from 3.0 to 4.0. In some cases, the method includes contacting the grape fluid composition with a reagent to obtain a pH of 5.0 or less, 4.9 or less, 4.8 or less, 4.5 or less, 4.4 or less, 4.3 or less, 4.2 or less, 4.1 or less, 3.8 or less, 3.7 or less, 3.6 or less, 3.5 or less, 3.4 or less, 3.3 or less, 3.2 or less, 3.1 or less, 3.0 or less, 2.9 or less, 2.8 or less, 2.7 or less, 2.6 or less, 2.5 or less, 2.4 or less, 2.3 or less, 2.2 or less, 2.1 or less, or 2.0 or less. In some cases, the method includes contacting the grape fluid composition with a reagent to obtain a pH ranging from, 2.0 to 4.0, from 2.0 to 5.0, from 2.5 to 5.0, from 2.5 to 4.0, from 2.5 to 3.9, from 2.5 to 3.8, from 2.5 to 3.7, from 2.5 to 3.5, from 2.5 to 3.0, from 2.6 to 3.6, from 2.6 to 3.5, from 2.7 to 3.4, from 2.7 to 3.3, from 2.7 to 3.2, from 2.7 to 3.1, from 2.8 to 3.5, from 2.8 to 3.2, from 2.8 to 3.0, from 3.0 to 3.5, from 3.1 to 3.3, from 3.6 to 4.0, or from 3.7 to 3.9.

In some cases, the grape fluid composition is further clarified (208). In some cases, the grape fluid composition is further clarified after modifying the pH of the grape fluid composition, e.g., after the grape fluid composition has been contacted with a reagent to modify the pH. In some cases, the clarifying includes filtering and/or centrifuging the grape fluid composition to obtain a desirable NTU, according to the methods described above.

In some cases, the method further includes optionally heating the grape fluid composition. The grape fluid composition may be heated after the step of clarifying (208). In some cases, the grape fluid composition is heated to a temperature ranging from 30 to 60 degrees Fahrenheit, from 40 to 60 degrees Fahrenheit, from 45 to 55 degrees Fahrenheit, from 40 to 50 degrees Fahrenheit, or from 45 to 50 degrees Fahrenheit.

Methods of the present disclosure may further include concentrating the grape fluid composition having a percent alcohol content to produce a HCC wine. In some cases, the concentrating includes ultra-filtering (209) the grape fluid composition having a percent alcohol content. The process of ultra-filtering the grape fluid composition may produce a permeate (211) and a HCC wine, which includes an amount of retentate (210) and may be stored for later use as a wine blender (214). The HCC wine may have any suitable qualities, e.g., pH, percent alcohol by volume, or sugar content, as described in further detail below. The "retentate" may refer to one or more components of an ultra-filtered fluid composition, e.g., grape fluid composition, that can be retained by a membrane or filter. The retentate may include molecular components having molecular weights greater than $5 \times 10^3$ to $20 \times 10^4$ Da, the membrane cutoff. The permeate (211) may be stored for later use as a blender to other wine blends, such as, e.g., rosé or red blends (213). The molecular weight of the molecular components of the permeate may be $5 \times 10^3$ to $20 \times 10^4$ Da or less, the membrane cutoff.

The grape fluid composition may be concentrated, e.g., ultra-filtered, to produce a HCC wine including any suitable amount of retentate. The percent concentration of the HCC wine may be a percent by volume (v/v), i.e., volume of permeate divided by the total volume of grape fluid composition, multiplied by 100%. In some cases, the HCC wine is at least 20% concentrated, at least 30% concentrated, at least 40% concentrated, at least 50% concentrated, at least 60% concentrated, at least 70% concentrated, at least 80% concentrated, or at least 90% concentrated. In some cases, the HCC wine is 60 to 95% concentrated, 65 to 95% concentrated, 70 to 95% concentrated, 75 to 95% concentrated, 75 to 90% concentrated, or 75 to 85% concentrated. In certain embodiments, the HCC wine is 80% concentrated.

The concentrating of the grape fluid composition to produce a HCC wine may occur at any suitable temperature. In some cases, the concentrating occurs at a temperature ranging from 40 to 100 degrees Fahrenheit, from 40 to 90 degrees Fahrenheit, from 40 to 85 degrees Fahrenheit, from 40 to 80 degrees Fahrenheit, from 40 to 75 degrees Fahrenheit, from 40 to 70 degrees Fahrenheit, from 40 to 65 degrees Fahrenheit, from 40 to 50 degrees Fahrenheit, from 40 to 60 degrees Fahrenheit, from 45 to 60 degrees Fahrenheit, from 50 to 60 degrees Fahrenheit, or from 55 to 60 degrees Fahrenheit.

The concentrating of the grape fluid composition may occur under any suitable feed pressure. In some cases, the feed pressure is maintained throughout the process of concentrating the grape fluid composition. In some cases, the method includes ultra-filtering the grape fluid composition under a feed pressure that ranges from 30 to 150 psi, from 30 to 140 psi, from 30 to 130 psi, from 30 to 120 psi, from 30 to 110 psi, from 30 to 100 psi, from 30 to 90 psi, from 30 to 85 psi, from 30 to 80 psi, from 30 to 70 psi, from 30 to 60 psi, from 30 to 50 psi, from 40 to 150 psi, from 45 to 150 psi, from 50 to 150 psi, from 55 to 150 psi, from 60 to 150 psi, from 65 to 150 psi, from 70 to 150 psi, from 40 to 130 psi, from 40 to 120 psi, or from 40 to 110 psi. In some cases, the method includes ultra-filtering the grape fluid composition under a pressure ranging from 5 to 50 psi, from 9 to 30 psi, from 10 to 30 psi, from 9 to 20 psi, or from 9 to 15 psi.

Any suitable membrane may be used for concentrating the grape fluid composition. In some cases, the method includes concentrating the grape fluid composition using a $10^2$ to $10^3$ Da, $10^3$ to $10^6$ Da, $10^3$ to $10^5$ Da, or $10^3$ to $10^6$ Da molecular weight cutoff ultrafiltration membrane. In some cases, the method includes concentrating the grape fluid composition using a 2,000-6,000 Dalton, 4000-6000 Dalton, or 5,000 Dalton molecular weight cutoff ultrafiltration membrane. One or more membranes may be used in the ultra-filtration methods of the present disclosure. The retentate may be recirculated one or more times through the ultra-filtration membrane(s).

In certain embodiments, methods of the present disclosure further include optionally fortifying (212) the HCC wine before later use as in blending with additional wine (214). The fortifying may include adding an amount of distilled alcohol derived from grapes to the HCC wine. The distilled alcohol may act as a stabilizer and preservative of the HCC wine and facilitate long term storage. In some cases, the fortifying may include measuring or testing the alcohol content of the HCC wine. Where the testing reveals the HCC wine has an undesirable alcohol content, an amount of distilled alcohol may be added to the HCC wine to produce an HCC wine with an increased alcohol content, e.g., a fortified HCC wine.

The distilled alcohol may have any suitable percent alcohol by volume. In some cases, the distilled alcohol is 20% alcohol or more by volume, 30% alcohol or more by volume, 40% alcohol or more by volume, 50% alcohol or more by volume, 60% alcohol or more by volume, 70% alcohol or more by volume, 80% alcohol or more by volume, or 90% alcohol or more by volume, or 93% alcohol or more by volume, or 95% alcohol or more by volume, or 96% alcohol or more by volume. In some cases, the distilled alcohol is at least 20% alcohol by volume, at least 30% alcohol by volume, at least 40% alcohol by volume, at least 50% alcohol by volume, at least 60% alcohol by volume, at least 70% alcohol by volume, at least 80% alcohol by volume, or at least 90% alcohol by volume. In some cases, the distilled alcohol contains from 10 to 60% alcohol by volume, from 10 to 50% alcohol by volume, from 10 to 40% alcohol by volume, from 10 to 30% alcohol by volume, or from 10 to 20% alcohol by volume. In some cases, the distilled alcohol contains an amount of alcohol by volume that is 1% alcohol by volume or greater, 5% alcohol by volume or greater, 10% alcohol by volume or greater, 15% alcohol by volume or greater, or 20% alcohol by volume or greater.

In some cases, the fortified HCC wine contains an amount of alcohol by volume that is at least 5% alcohol by volume, at least 8% alcohol by volume, at least 10% alcohol, at least 15% alcohol, or at least 20% alcohol. In some cases, the fortified HCC wine contains from 5 to 60% alcohol by volume, from 5 to 50% alcohol by volume, from 5 to 40% alcohol by volume, from 5 to 30% alcohol by volume, from 5 to 20% alcohol by volume, from 8 to 60% alcohol by volume, from 8 to 50% alcohol by volume, from 8 to 40% alcohol by volume, from 8 to 30% alcohol by volume, from 8 to 20% alcohol by volume, from 8 to 15% alcohol by volume, from 10 to 60% alcohol by volume, from 10 to 50% alcohol by volume, from 10 to 40% alcohol by volume, from 10 to 30% alcohol by volume, from 10 to 20% alcohol by volume, from 10 to 15% alcohol by volume, from 10 to 13% alcohol by volume, from 10 to 12% alcohol by volume, or from 9 to 15% alcohol by volume.

In some cases, the HCC wine is further processed, e.g., after addition of distilled alcohol. The further processing may include the adjustment of one or more qualities of the HCC wine, e.g., fortified HCC wine, to promote stability. In some cases, the further processing includes testing the pH of the HCC wine. Where the testing reveals the HCC wine has an undesirable pH, the methods may include contacting or treating the HCC wine with a reagent to further adjust the pH to obtain a suitable pH according to the methods for modifying pH as described above. In some cases, the further processing includes clarifying, e.g., filtering and/or centrifuging, the HCC wine to obtain a desirable NTU, according to the methods described above. In certain aspects, the further processing includes heating the HCC wine. In some case, the HCC wine is heated to temperatures ranging from 40 to 90 degrees Fahrenheit, from 40 to 85 degrees Fahrenheit, from 40 to 80 degrees Fahrenheit, from 40 to 75 degrees Fahrenheit, from 45 to 70 degrees Fahrenheit, from 40 to 65 degrees Fahrenheit, from 40 to 50 degrees Fahrenheit, from 40 to 60 degrees Fahrenheit, from 45 to 60 degrees Fahrenheit, from 50 to 65 degrees Fahrenheit, from 50 to 60 degrees Fahrenheit, or from 55 to 60 degrees Fahrenheit. The HCC wine may be heated for any suitable amount of time including, e.g., 1 to 5 minutes, for 1 to 10 minutes, for 1 to 30 minutes, for 10 to 30 minutes, for 10 minutes to an hour, for one to two hours, for one to five hours, for one to eight hours, for one to ten hours, for five to eight hours, for five to ten hours, for five to fifteen hours, or for five to twenty hours.

In another aspect, the method includes additional means of preparing the HCC wine for long-term storage. The preparing may include adding to the HCC wine one or more blenders such as, e.g., sulfur dioxide, in the manner described above to preserve the stability of the HCC wine. In some cases, sulfur dioxide may be added to one or more of the must, the grape fluid composition, and the HCC wine at any step of the subject methods, according to the methods described above. In some cases, one or more of the must, the grape fluid composition, and the HCC wine contain an amount of $FSO_2$ in any of the ranges provided herein. In some cases, the preparing includes cooling the HCC wine. The HCC wine may be cooled to any suitable temperature, e.g., to facilitate stability during storage. In some cases, the HCC wine may be cooled to a temperature of 80 degrees Fahrenheit or less, 75 degrees Fahrenheit or less, 70 degrees Fahrenheit or less, 65 degrees Fahrenheit or less, 60 degrees Fahrenheit or less, 55 degrees Fahrenheit or less, 50 degrees Fahrenheit or less, 45 degrees Fahrenheit or less, 40 degrees Fahrenheit or less, 35 degrees Fahrenheit or less, 30 degrees Fahrenheit or less, 25 degrees Fahrenheit or less, or 20 degrees Fahrenheit or less. In some cases, the HCC wine is cooled to a temperature ranging from 15 to 50 degrees Fahrenheit, from 20 to 45 degrees Fahrenheit, from 25 to 40 degrees Fahrenheit, from 45 to 50 degrees Fahrenheit, or from 30 to 35 degrees Fahrenheit. The final temperature of the HCC wine may be maintained throughout storage.

Composition

In another aspect, the present disclosure provides a HCC wine. The HCC wine may find use as a wine blender. The HCC wine may be prepared from one or more grapes according to any of the subject methods, described in detail above. The HCC wine may be formulated for long term storage for later addition to wine as a blender.

First Embodiment

The present disclosure provides an HCC wine that may be prepared from one or more grapes according to the first embodiment of the methods or any suitable variation thereof, described in detail above.

The HCC wine may have any suitable pH. In some cases, the HCC wine has a pH of 5.0 or less, 4.9 or less, 4.8 or less, 4.5 or less, 4.4 or less, 4.3 or less, 4.2 or less, 4.1 or less, 3.8 or less, 3.7 or less, 3.6 or less, 3.5 or less, 3.4 or less, 3.3 or less, 3.2 or less, 3.1 or less, 3.0 or less, 2.9 or less, 2.8 or less, 2.7 or less, 2.6 or less, 2.5 or less, 2.4 or less, 2.3 or less, 2.2 or less, 2.1 or less, or 2.0 or less. In some cases, the HCC wine has a pH ranging from 2.0 to 4.0, from 2.0 to 5.0, from 2.5 to 5.0, from 2.5 to 4.0, from 2.5 to 3.9, from 2.5 to 3.8, from 2.5 to 3.7, from 2.5 to 3.5, from 2.5 to 3.0, from 2.6 to 3.6, from 2.6 to 3.5, from 2.7 to 3.4, from 2.7 to 3.3, from 2.7 to 3.2, from 2.7 to 3.1, from 2.8 to 3.5, from 2.8 to 3.2, from 2.8 to 3.0, from 3.0 to 3.5, from 3.1 to 3.3, from 3.6 to 4.0, or from 3.7 to 3.9.

The HCC wine may have any suitable sugar content. In some cases, the sugar content of the HCC wine ranges from 20 to 50 degrees Brix, from 20 to 40 degrees Brix, from 22 to 38 degrees Brix, from 23 to 36 degrees Brix, or from 25 to 35 degrees Brix, from 28 to 32 degrees Brix, or from 29 to 31 degrees Brix. In some cases, the HCC wine has a sugar content that is 15 degrees Brix or higher, 16 degrees Brix or higher, 17 degrees Brix or higher, 18 degrees Brix or higher, 19 degrees Brix or higher, 20 degrees Brix or higher, 21 degrees Brix or higher, 22 degrees Brix or higher, 24 degrees Brix or higher, 25 degrees Brix or higher, 26 degrees Brix or higher, 27 degrees Brix or higher, 28 degrees Brix or higher, 29 degrees Brix or higher, 30 degrees Brix or higher, 35 degrees Brix or higher, 40 degrees Brix or higher, 45 degrees Brix or higher, or 50 degrees Brix or higher.

In some cases, the HCC wine contains an amount of alcohol by volume that is at least 5% alcohol by volume, at least 8% alcohol by volume, at least 10% alcohol, at least 15% alcohol, or at least 20% alcohol. In some cases, the HCC wine contains from 5 to 60% alcohol by volume, from 5 to 50% alcohol by volume, from 5 to 40% alcohol by volume, from 5 to 30% alcohol by volume, from 5 to 20% alcohol by volume, from 8 to 60% alcohol by volume, from 8 to 50% alcohol by volume, from 8 to 40% alcohol by volume, from 8 to 30% alcohol by volume, from 8 to 20% alcohol by volume, from 8 to 15% alcohol by volume, from 10 to 60% alcohol by volume, from 10 to 50% alcohol by volume, from 10 to 40% alcohol by volume, from 10 to 30% alcohol by volume, from 10 to 20% alcohol by volume, from 10 to 15% alcohol by volume, from 10 to 13% alcohol by volume, or from 10 to 12% alcohol by volume.

In some cases, the HCC wine includes an amount of free sulfur dioxide ($FSO_2$). The concentration of free sulfur dioxide may be 10 ppm or higher, 15 ppm or higher, 20 ppm or higher, 25 ppm or higher, 30 ppm or higher, 35 ppm or higher, 40 ppm or higher, 45 ppm or higher, 50 ppm or higher, 55 ppm or higher, 60 ppm or higher, 70 ppm or higher, 80 ppm or higher, 90 ppm or higher, 100 ppm or higher, 110 ppm or higher, 120 ppm or higher, 130 ppm or higher, 135 ppm or higher, 140 ppm or higher, 145 ppm or higher, or 150 ppm or higher. In some cases, the concentration of free sulfur dioxide in the HCC wine may range from 5 ppm to 60 ppm, from 5 ppm to 50 ppm, from 5 ppm to 40 ppm, from 10 ppm to 60 ppm, from 15 ppm to 60 ppm, from 20 ppm to 60 ppm, from 30 ppm to 60 ppm, from 30 ppm to 50 ppm, from 30 ppm to 45 ppm, from 35 ppm to 45 ppm, or from 35 ppm to 40 ppm. In some cases, the concentration of free sulfur dioxide in the HCC wine ranges from 35 to 150 ppm, from 40 to 150 ppm, from 50 to 150 ppm, from 60 to 150 ppm, from 70 to 150 ppm, from 80 to 150 ppm, from 90 to 150 ppm, from 100 to 150 ppm, from 110 to 150 ppm, from 120 to 150 ppm, from 130 to 150 ppm, or from 140 to 150 ppm, from 80 to 170 ppm, from 90 to 160 ppm, from 100 to 160 ppm, from 120 to 160 ppm, from 130 to 160 ppm, from 140 to 160 ppm.

Second Embodiment

The present disclosure provides an HCC wine that may be prepared from one or more grapes according to the second embodiment of the methods or any suitable variation thereof, described in detail above.

The HCC wine may have any suitable pH. In some cases, the HCC wine has a pH of 5.0 or less, 4.9 or less, 4.8 or less, 4.5 or less, 4.4 or less, 4.3 or less, 4.2 or less, 4.1 or less, 3.8 or less, 3.7 or less, 3.6 or less, 3.5 or less, 3.4 or less, 3.3 or less, 3.2 or less, 3.1 or less, 3.0 or less, 2.9 or less, 2.8 or less, 2.7 or less, 2.6 or less, 2.5 or less, 2.4 or less, 2.3 or less, 2.2 or less, 2.1 or less, or 2.0 or less. In some cases, the HCC wine has a pH ranging from 2.0 to 4.0, from 2.0 to 5.0, from 2.5 to 5.0, from 2.5 to 4.0, from 2.5 to 3.9, from 2.5 to 3.8, from 2.5 to 3.7, from 2.5 to 3.5, from 2.5 to 3.0, from 2.6 to 3.6, from 2.6 to 3.5, from 2.7 to 3.4, from 2.7 to 3.3, from 2.7 to 3.2, from 2.7 to 3.1, from 2.8 to 3.5, from 2.8 to 3.2, from 2.8 to 3.0, from 3.0 to 3.5, from 3.1 to 3.3, from 3.6 to 4.0, or from 3.7 to 3.9.

The HCC wine may have any suitable sugar content. In some cases, the sugar content of the HCC wine ranges from −5 to 20 degrees Brix, from −5 to 15 degrees Brix, from −5 to 10 degrees Brix, from −2 to 10 degrees Brix, from 0 to 20 degrees Brix, from 0 to 15 degrees Brix, from 0 to 10 degrees Brix, from 0 to 5 degrees Brix, from −5 to 5 degrees Brix, from −5 to 2 degrees Brix, from −5 to 0 degrees Brix, from −4 to 5 degrees Brix, from −4 to 2 degrees Brix, from −4 to 0 degrees Brix from −3 to 5 degree Brix, from −3 to 2 degrees Brix, from −3 to 0 degrees Brix, from −2 to 5 degrees, from −2 to 2 degrees, or from −2 to 0 degrees Brix. In some cases, the sugar content of the HCC wine ranges from 5 to 15 degrees Brix, from 5 to 10 degrees Brix, from 1 to 10 degrees Brix, from 1 to 5 degrees Brix, or from 0 to 3 degrees Brix. In some cases, the sugar content of the HCC wine is 20 degrees Brix or less, 15 degrees Brix or less, 10 degrees Brix or less, 5 degrees Brix or less, 2 degrees Brix or less, 0 degree Brix or less, or −2 degree Brix or less.

In some cases, the HCC wine contains an amount of alcohol by volume that is at least 5% alcohol by volume, at least 8% alcohol by volume, at least 10% alcohol, at least 15% alcohol, or at least 20% alcohol. In some cases, the HCC wine contains from 5 to 60% alcohol by volume, from 5 to 50% alcohol by volume, from 5 to 40% alcohol by volume, from 5 to 30% alcohol by volume, from 5 to 20% alcohol by volume, from 8 to 60% alcohol by volume, from 8 to 50% alcohol by volume, from 8 to 40% alcohol by volume, from 8 to 30% alcohol by volume, from 8 to 20% alcohol by volume, from 8 to 15% alcohol by volume, from 10 to 60% alcohol by volume, from 10 to 50% alcohol by volume, from 10 to 40% alcohol by volume, from 10 to 30% alcohol by volume, from 10 to 20% alcohol by volume, from 10 to 15% alcohol by volume, from 10 to 13% alcohol by volume, or from 10 to 12% alcohol by volume.

In some cases, the HCC wine includes an amount of free sulfur dioxide ($FSO_2$). The concentration of free sulfur dioxide may be 10 ppm or higher, 15 ppm or higher, 20 ppm or higher, 25 ppm or higher, 30 ppm or higher, 35 ppm or higher, 40 ppm or higher, 45 ppm or higher, 50 ppm or higher, 55 ppm or higher, 60 ppm or higher, 70 ppm or higher, 80 ppm or higher, 90 ppm or higher, 100 ppm or higher, 110 ppm or higher, 120 ppm or higher, 130 ppm or higher, 135 ppm or higher, 140 ppm or higher, 145 ppm or higher, or 150 ppm or higher. In some cases, the concentration of free sulfur dioxide in the HCC wine may range from 5 ppm to 60 ppm, from 5 ppm to 50 ppm, from 5 ppm to 40 ppm, from 10 ppm to 60 ppm, from 15 ppm to 60 ppm, from 20 ppm to 60 ppm, from 30 ppm to 60 ppm, from 30 ppm to 50 ppm, from 30 ppm to 45 ppm, from 35 ppm to 45 ppm, or from 35 ppm to 40 ppm. In some cases, the concentration of free sulfur dioxide in the HCC wine ranges from 35 to 150 ppm, from 40 to 150 ppm, from 50 to 150 ppm, from 60 to 150 ppm, from 70 to 150 ppm, from 80 to 150 ppm, from 90 to 150 ppm, from 100 to 150 ppm, from 110 to 150 ppm, from 120 to 150 ppm, from 130 to 150 ppm, or from 140 to 150 ppm, from 80 to 170 ppm, from 90 to 160 ppm, from 100 to 160 ppm, from 120 to 160 ppm, from 130 to 160 ppm, from 140 to 160 ppm.

Utility

The methods and compositions of the present disclosure find use in a variety of different applications, including blending wine. In some cases, the methods and compositions of the present disclosure find use in blending wine. In some cases, the methods may be used to produce a HCC wine that is capable of long-term storage for later addition to wine as a blender. The HCC wine may be added to a wine to provide color, flavor, texture to or to enhance the mouth feel of the wine.

EXAMPLES

As can be appreciated from the disclosure provided above, the present disclosure has a wide variety of applications. Accordingly, the following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Those of skill in the art will readily recognize a variety of noncritical parameters that could be changed or modified to yield essentially similar results. Thus, the following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, dimensions, etc.) but some experimental errors and deviations should be accounted for.

Example 1

An exemplary method for preparing a HCC wine of FIG. 1 is described below:
1. Pick Rubired grapes at 24.0 Brix or higher.
2. Crush and destem grapes into a red fermentation tank.
   a. Add >75 ppm SO2
   b. Adjust pH to <3.8 pH with tartaric acid.
   c. Add an enzyme formulated for Thermovinification to the juice.
3. Heat the juice to >120 degrees Fahrenheit.
4. Let the juice sit for a minimum of 4 hours.
5. While still hot, drain the free run juice through a chiller to a storage tank.
6. Press the Cap/Solids to the same storage tank as in step 5.

7. Chill the storage tank down to 30-35 degrees Fahrenheit.
   a. Add 100 ppm SO2 while chilling.
   b. Add 3.5 pounds/1000 gallons of tannin while chilling.
8. Filter juice through a Lees Filter to another storage tank.
9. Do a Wine Spirits Addition. Add High Proof alcohol to wine. Target 11.0% blend alcohol.
10. Adjust pH to <3.2 pH with tartaric acid or ion exchange.
11. Centrifuge wine to another storage tank.
12. Filter wine to <5 NTU to another storage tank.
13. Move desired amount of wine to a jacketed tank.
14. Heat wine to 40-50 degrees Fahrenheit.
15. Ultrafilter wine to desired concentration—retentate should be close to 80% concentrated.
   a. Maintain 40-50 degree Fahrenheit temperature on the retentate during filtration. The permeate can be chilled to desired storage temperature during filtration.
16. After Ultrafiltering, chill the retentate back down to 30-35 degrees Fahrenheit for storage.
17. SO2 can be added at any step, if needed, to keep the juice/wine stable. Target 35-40 ppm $FSO_2$.
18. After step 7, the juice/wine should be at 30-35 degrees Fahrenheit, unless specified. Use jackets on tank or external chilling to maintain temperature.

Example 2

An exemplary method for preparing a HCC wine of FIG. 2 is described below:
1. Pick Rubired grapes at 24.0 Brix or higher.
2. Crush and destem grapes into a red fermentation tank.
   a. Add >75 ppm SO2
   b. Adjust pH to <3.8 pH with tartaric acid.
   c. Add an enzyme formulated for red grapes to the juice.
3. Add yeast, tannin, yeast nutrient and additional tartaric acid (if needed) before and/or during fermentation.
4. Allow the juice to ferment to dryness. Dryness means all fermentable sugar is converted to alcohol by the yeast.
5. Drain the free run juice to a storage tank.
6. Press the Cap/Solids to the same storage tank as in step 5.
7. Clarify the juice by either settling and racking or by centrifuging to another storage tank.
8. Add Malolactic Bacteria to the juice.
9. After Malolactic Fermentation is complete.
   a. Add 50 ppm SO2
   b. Chill wine to 45 deg.
10. Adjust pH to <3.8 pH with tartaric acid or ion exchange.
11. Centrifuge wine to another storage tank (if not previously centrifuged).
12. Filter wine to <5 NTU to another storage tank.
13. Move desired amount of wine to a jacketed tank.
14. Heat wine to 45-50 degrees Fahrenheit (if needed).
15. Ultrafilter wine to desired concentration—retentate should be close to 80% concentrated.
   a. Maintain 45-50 degree Fahrenheit temperature on the retentate during filtration. The permeate can be chilled to desired storage temperature during filtration.
16. SO2 can be added at any step, if needed, to keep the juice/wine stable. Target 35-40 ppm FSO2.
17. After step 7, the juice/wine should be at 45-50 degrees Fahrenheit, unless specified. Use jackets on tank or external chilling to maintain temperature.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims. It is also to be understood that the terminology used herein is for the purpose of describing particular embodiments only, and is not intended to be limiting, since the scope of the present invention will be limited only by the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

What is claimed is:

1. A method for preparing a high color concentrated (HCC) wine, the method comprising:
   obtaining a grape fluid composition from one or more grapes having a sugar content that is 24 degrees Brix or greater;
   adding greater than 75 ppm sulfur dioxide to the grape fluid composition;
   adjusting pH of the grape fluid composition to about 3.8;
   performing thermovinification on the grape fluid composition, wherein the grape fluid composition is heated to a temperature of at least 120° F.;
   letting the grape fluid composition sit for a minimum of 4 hours;
   chilling the grape fluid composition to a temperature of 30° F. to 35° F.;
   adding 90-110 ppm sulfur dioxide to the grape fluid composition;
   adding an amount of tannin to the grape fluid composition ranging from 3 pounds of tannin/1000 gallons of the grape fluid composition to 5 pounds of tannin/1000 gallons of the grape fluid composition;
   adding alcohol to the grape fluid composition to produce a fortified wine composition comprising at least 11% blend alcohol;
   adjusting pH of the grape fluid composition to less than 3.2;
   filtering the grape fluid composition;

heating the grape fluid composition to 40° to 50° Fahrenheit;

ultrafiltering the grape fluid composition to produce a retentate and a permeate, wherein the retentate is at least 80% concentrated;

chilling the retentate to a temperature of 30° to 35° Fahrenheit; and adding 35-40 ppm sulfur dioxide to the retentate to produce the HCC wine.

2. The method of claim 1, further comprising blending the HCC wine or the permeate with another wine.

3. The method of claim 1, wherein the one or more grapes comprise one or more rubired grapes.

4. A method for preparing a high color concentrated (HCC) wine, the method comprising:

obtaining a grape fluid composition from one or more grapes having a sugar content that is 24 degrees Brix or greater;

adding greater than 75 ppm sulfur dioxide to the grape fluid composition;

adjusting pH of the grape fluid composition to about 3.8;

adding yeast to the grape fluid composition;

performing fermentation on the grape fluid composition until all fermentable sugar in the grape fluid composition is converted to alcohol by the yeast;

clarifying the grape fluid composition;

performing malolactic fermentation on the grape fluid composition;

adding about 50 ppm sulfur dioxide to the grape fluid composition;

chilling the grape fluid composition to a temperature of about 45° F.;

adjusting pH of the grape fluid composition to about 3.8;

filtering the grape fluid composition;

heating the grape fluid composition to a temperature of 45° F. to 50° F.;

ultrafiltering the grape fluid composition to produce a retentate and a permeate, wherein the retentate is at least 80% concentrated; and adding 35-40 ppm sulfur dioxide to the retentate to produce the HCC wine.

5. The method of claim 4, further comprising blending the HCC wine or the permeate with another wine.

6. The method of claim 4, wherein the one or more grapes comprise one or more rubired grapes.

* * * * *